(12) United States Patent
Eckles et al.

(10) Patent No.: US 7,591,073 B1
(45) Date of Patent: Sep. 22, 2009

(54) DEVICE AND METHOD FOR MEASURING DOOR GAPS

(75) Inventors: Walter M. Eckles, Collierville, TN (US); Thomas E. Cheatham, Taylorsville, KY (US); Brent A. Eckles, Collierville, TN (US); Keith E. Pardoe, Vealeton, VA (US)

(73) Assignee: PL2, LLC, Collierville, TN (US)

( * ) Notice: Subject to any disclaimer, the term of this patent is extended or adjusted under 35 U.S.C. 154(b) by 46 days.

(21) Appl. No.: 12/106,095

(22) Filed: Apr. 18, 2008

(51) Int. Cl.
*E04F 21/04* (2006.01)
*G01B 3/42* (2006.01)

(52) U.S. Cl. .................. 33/194; 33/562; 33/501.08
(58) Field of Classification Search .................. 33/194, 33/501.08, 562, 567, 782, 836
See application file for complete search history.

(56) References Cited

U.S. PATENT DOCUMENTS

| 924,877 | A | * | 6/1909 | Banfill | ............ | 33/566 |
|---|---|---|---|---|---|---|
| 937,302 | A | * | 10/1909 | Harris | ............ | 33/782 |
| 1,624,150 | A | * | 4/1927 | Scherer | ............ | 33/562 |
| 2,536,401 | A | * | 1/1951 | Victor | ............ | 33/567 |
| 4,345,380 | A | | 8/1982 | Vis | | |
| 4,584,774 | A | | 4/1986 | Link | | |
| 5,129,153 | A | | 7/1992 | Burns, Sr. | | |
| 5,329,703 | A | | 7/1994 | Craig | | |
| 5,471,759 | A | | 12/1995 | Burrows | | |
| 5,604,988 | A | * | 2/1997 | Costelloe | ............ | 33/194 |
| 5,666,738 | A | | 9/1997 | Nybro | | |
| 6,279,241 | B1 | | 8/2001 | Chen | | |
| 6,308,429 | B1 | | 10/2001 | Green | | |
| 6,336,275 | B1 | | 1/2002 | Shigyo | | |
| 6,341,427 | B1 | * | 1/2002 | Tepley | ............ | 33/194 |
| 6,381,908 | B1 | * | 5/2002 | Fisher | ............ | 33/562 |
| 6,571,484 | B2 | | 6/2003 | Hastilow | | |
| 6,807,777 | B2 | | 10/2004 | Wagner | | |
| 6,862,815 | B1 | | 3/2005 | Blouch | | |
| 6,901,672 | B1 | | 6/2005 | Reilly | | |
| 7,152,336 | B2 | | 12/2006 | Orr | | |
| 7,240,436 | B1 | * | 7/2007 | Miller et al. | ............ | 33/194 |
| 7,513,049 | B2 | * | 4/2009 | Williams | ............ | 33/562 |
| 2002/0133957 | A1 | * | 9/2002 | Farese | ............ | 33/194 |
| 2003/0131486 | A1 | * | 7/2003 | Wallace | ............ | 33/194 |
| 2005/0022397 | A1 | * | 2/2005 | Neblo | ............ | 33/194 |
| 2008/0229598 | A1 | * | 9/2008 | Liu | ............ | 33/562 |

OTHER PUBLICATIONS

Bojo, Inc., Metric Gap Gauge Tool, Part No. GTR-M-PMMA-BK, Website: http://bojoinc.com/catalog/product_info.php?products_id=119; Bojo Inc, 473 Sapena Ct, Suite 19, Santa Clara, Ca. 95054, 408-844-8211.

Quality Elevator Products, Inc., Door Gap Gauge, Part No. Model DGG, Website: http://www.qualityelev.com/main/tool/dgap.htm; Quality Elevator Products, Inc., 7760 Merrimac Ave., Niles, IL 60714, 1-800-222-3688.

Spartan Tool Sales Inc. USA, Large Wedge Tapered Gauge, Part No. 1TG270B, Website: http://www.spartantoolsales.com/; Spartan Tool Sales, Inc., Sterling Heights, Michigan 48311 USA, 1-586-268-1556.

(Continued)

*Primary Examiner*—G. Bradley Bennett
(74) *Attorney, Agent, or Firm*—Roy E. Williams

(57) ABSTRACT

A device and method for determining compliance with building construction codes comprises a block of material with a plurality of planar measuring surfaces separated by appropriate distances that are representative of a maximum or minimum gap space between a door and an adjacent structure, as permitted by industry standards. The appropriate measuring surfaces are inserted in the gap opening between the door and adjacent structure to be tested and quickly and easily indicate whether the gap meets building construction codes. The device functions as one tool to quickly check compliance of all gap openings related to door installations without hindrance from door installation hardware.

20 Claims, 23 Drawing Sheets

OTHER PUBLICATIONS

Fire Door Inspections, Wedgee, Website: http://shop.firedoorinspections.com/main.sc; Fire Door Inspections, PO Box 303, Lacona, NY 13083 USA, (315) 387-6639.

Accurex Measurement, Inc., The Gap Gun; Website: http://www.accurexmeasure.com/gap_&_flush.htm; Accurex Measurement, Inc., 200 Grove Rd., West Deptford NJ 08066, 1-800-535-5798.

* cited by examiner

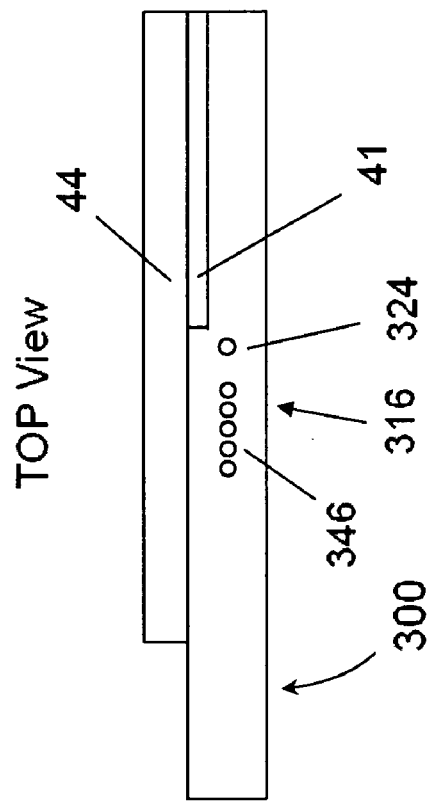
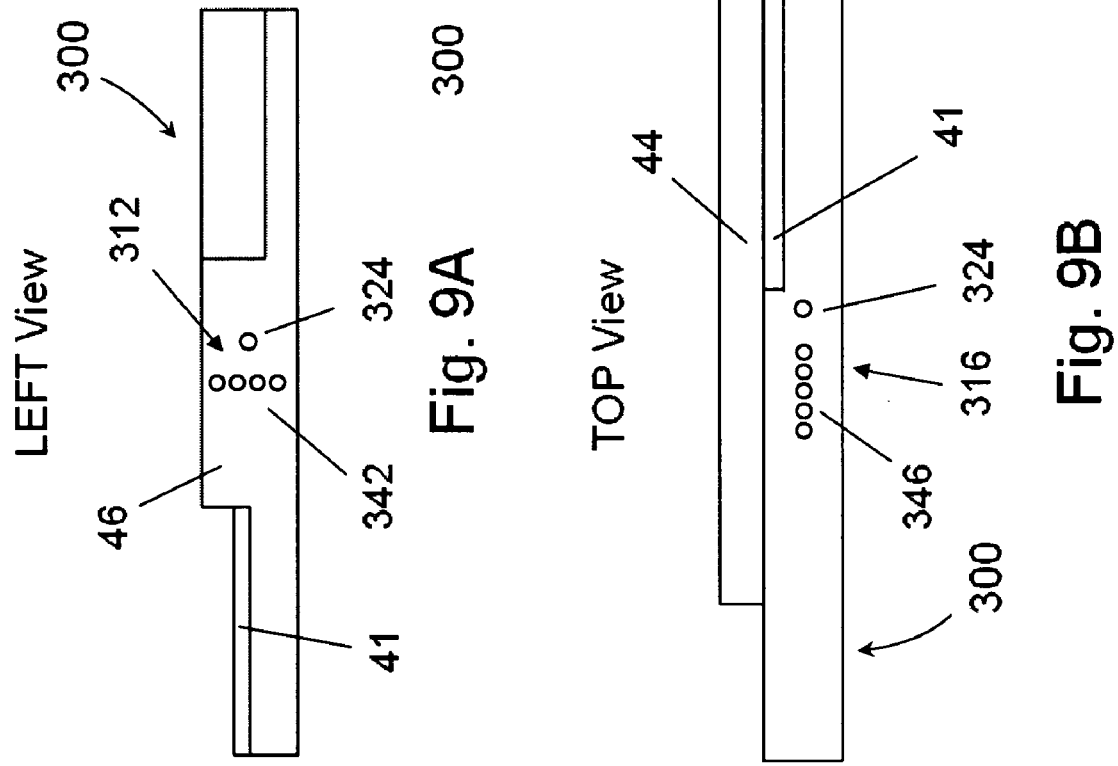
Fig. 9A  Fig. 9B
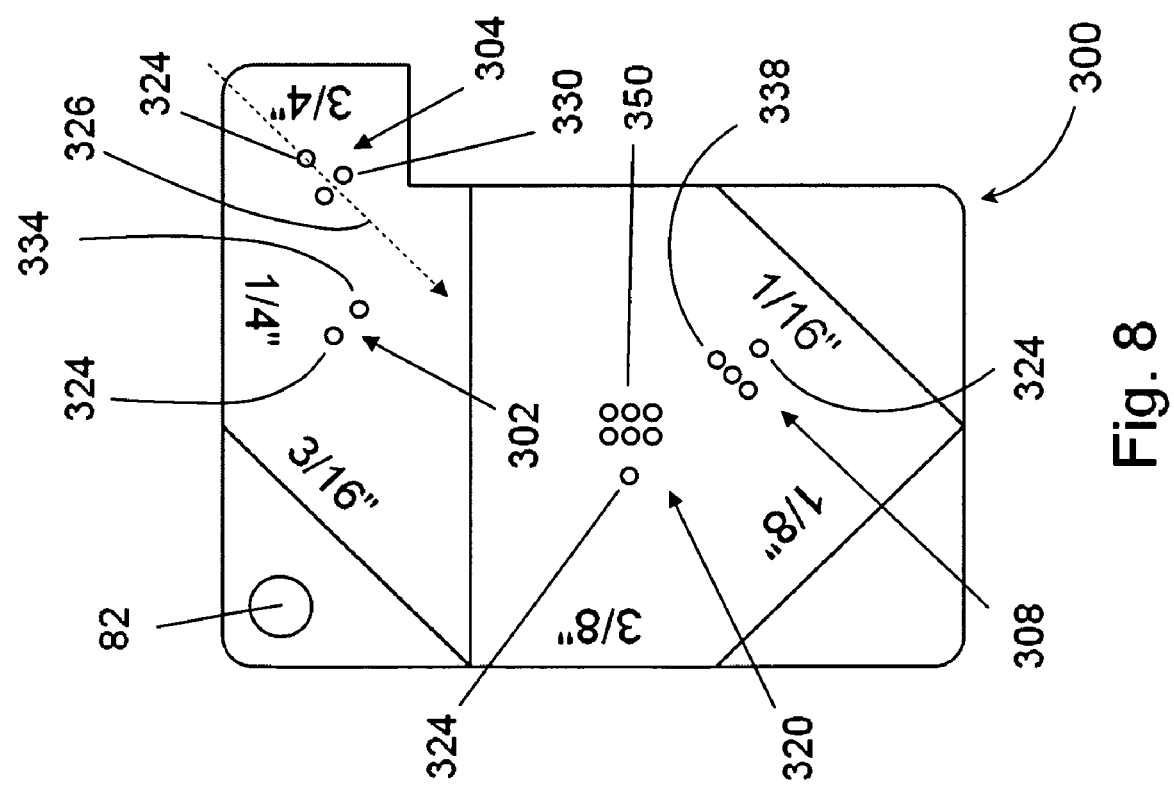
Fig. 8

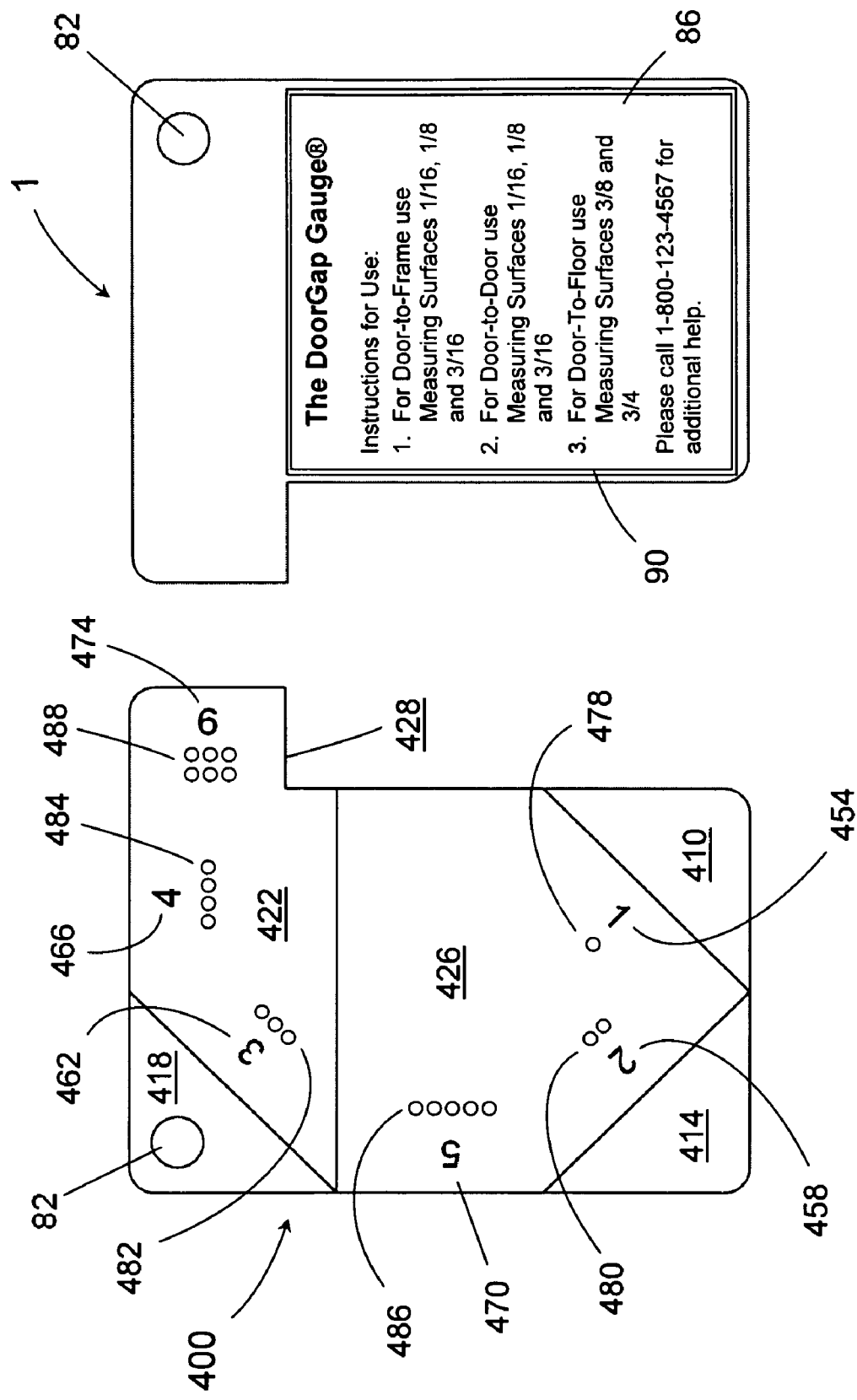

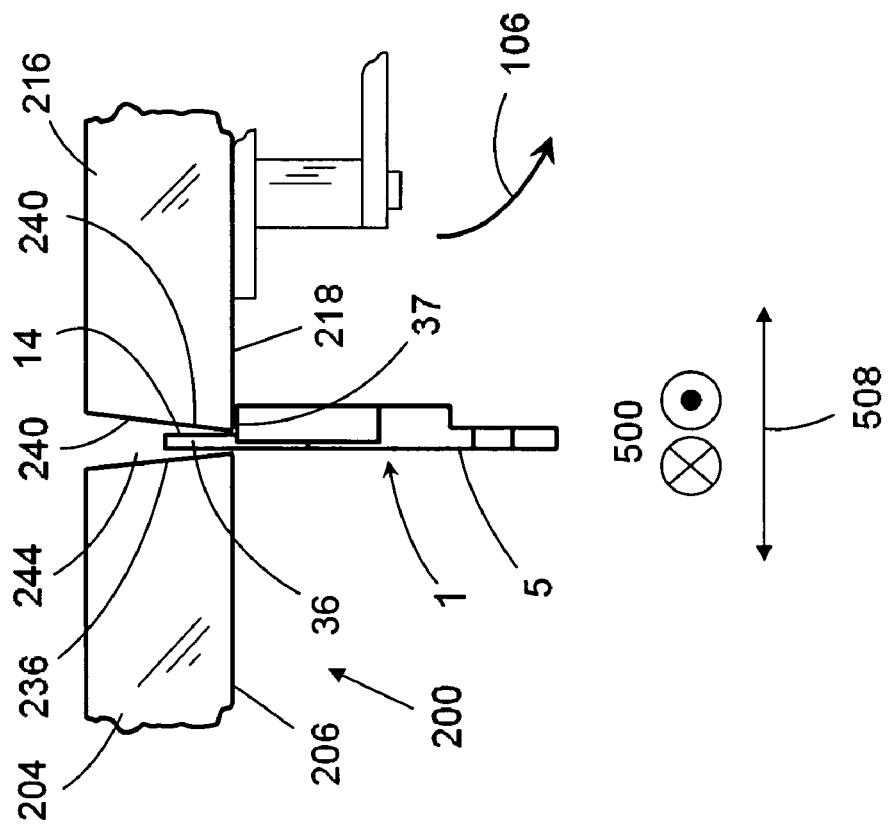
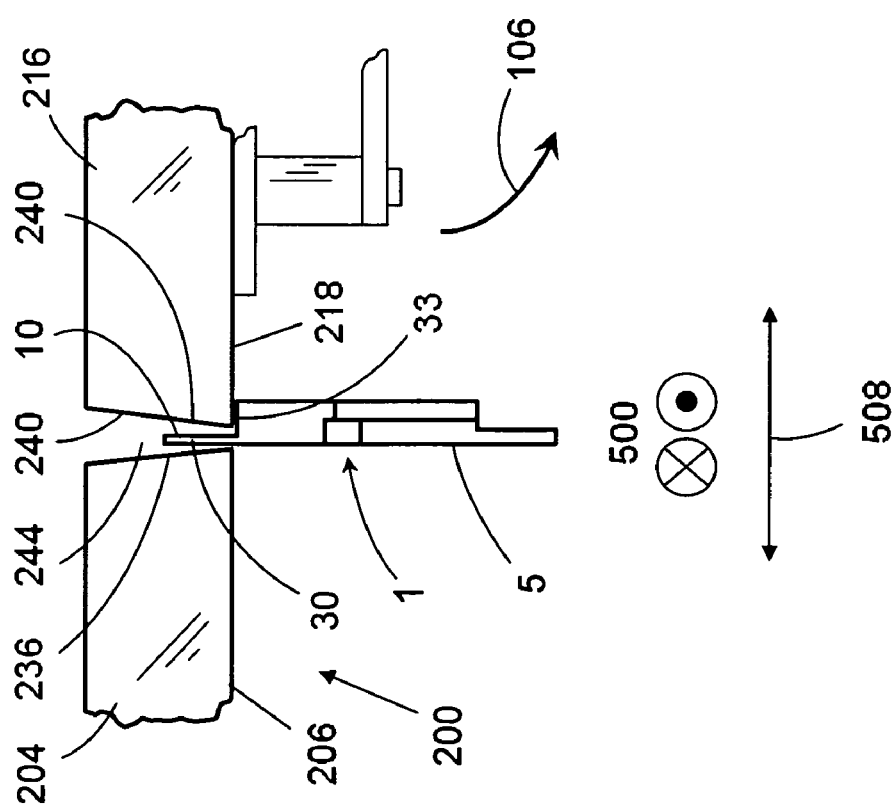

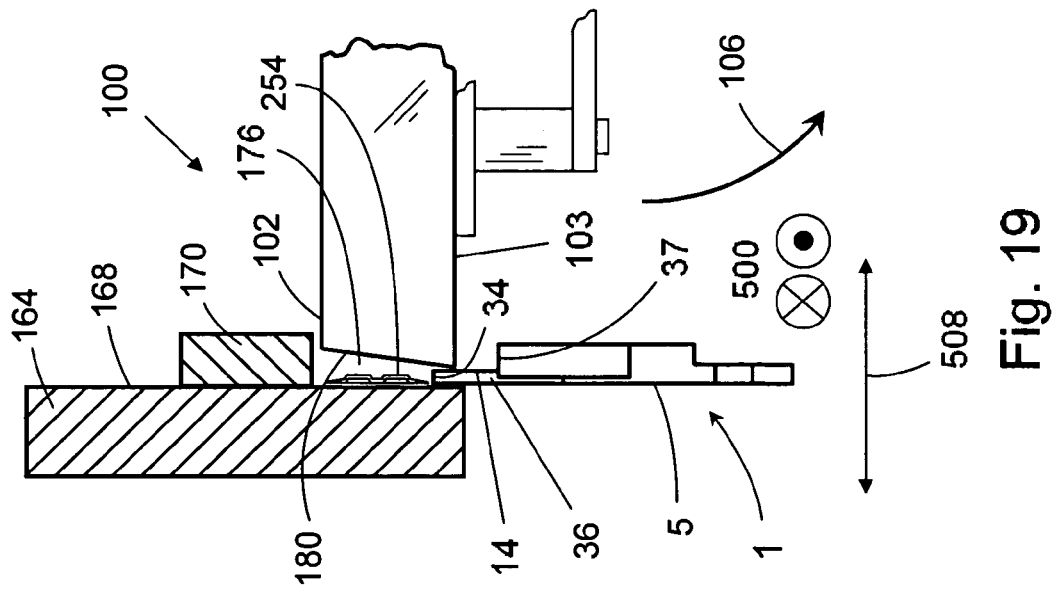
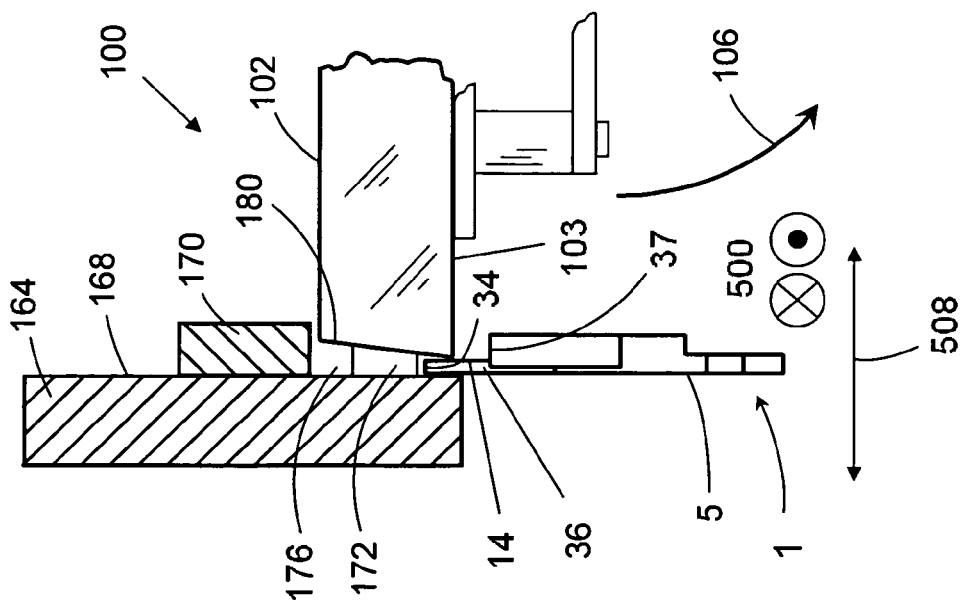

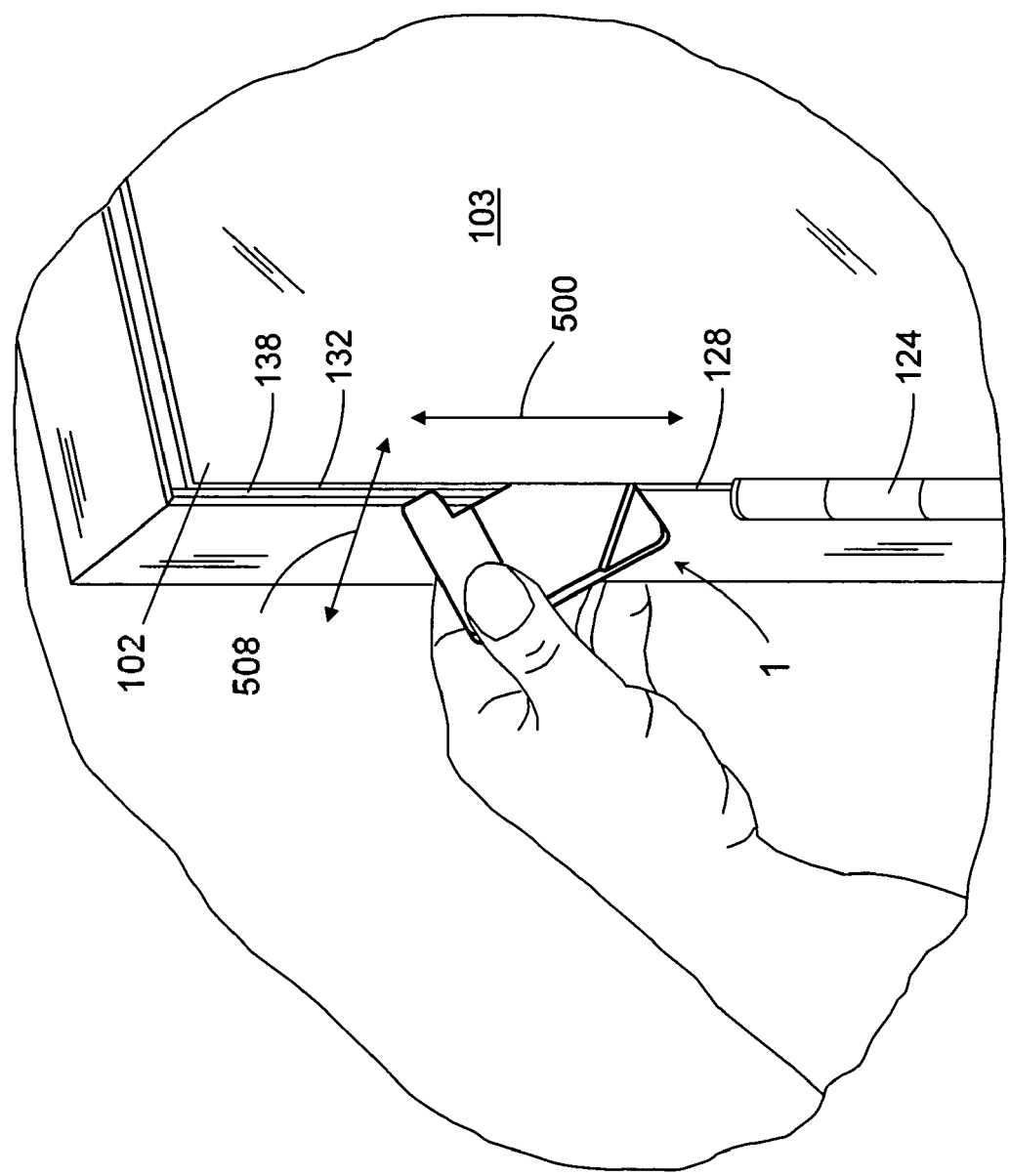

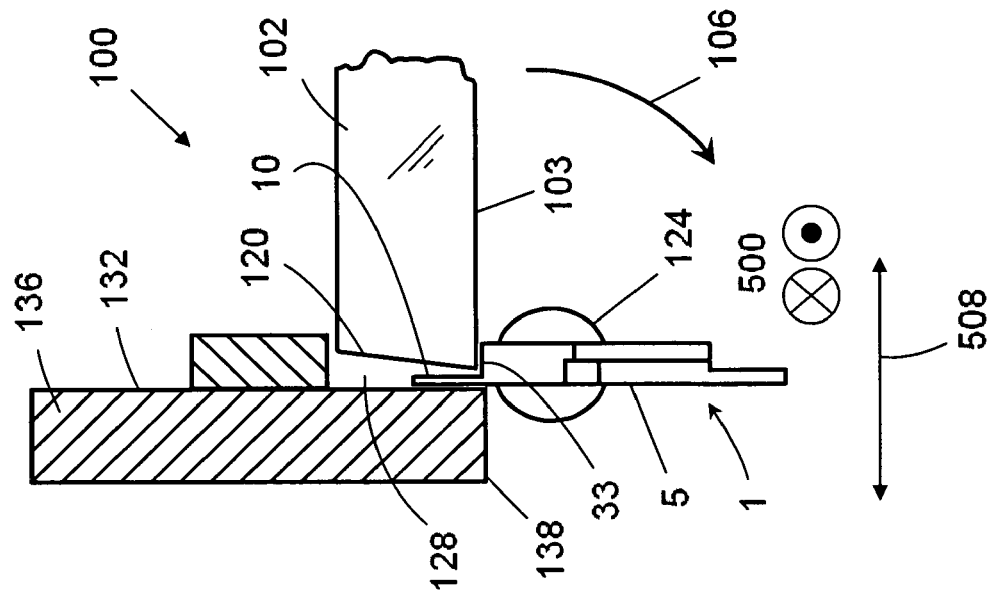
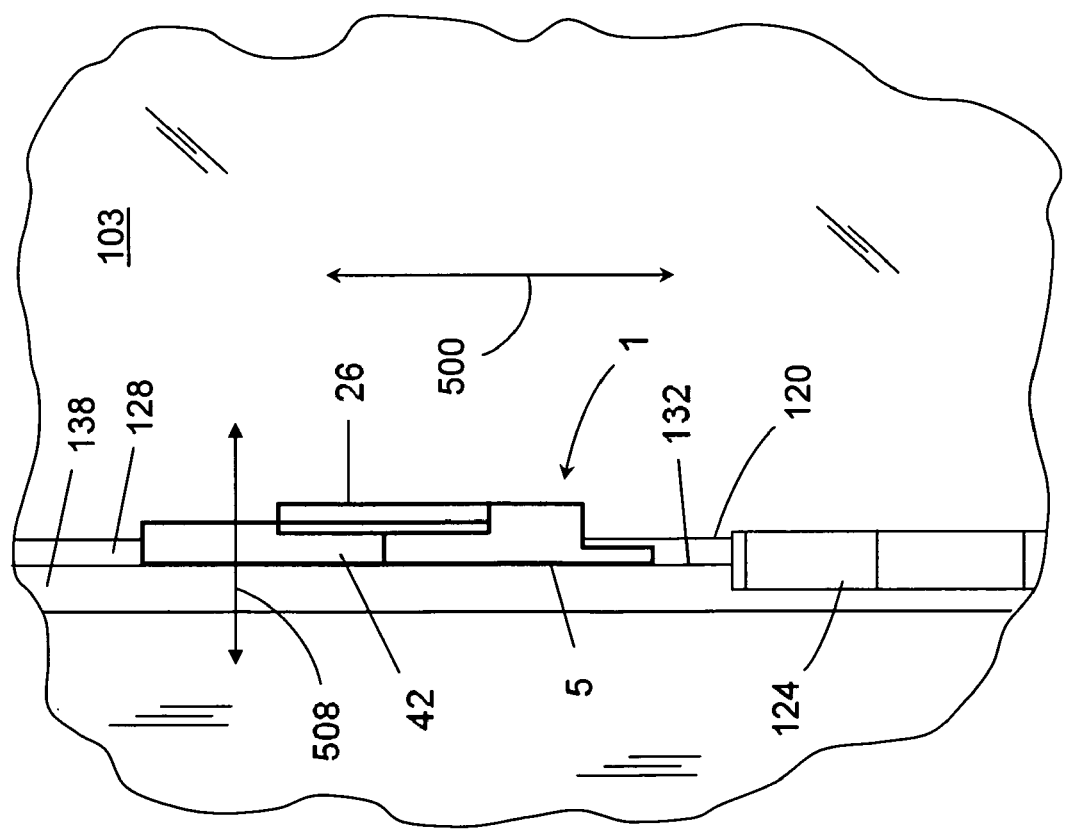

DEVICE AND METHOD FOR MEASURING DOOR GAPS

CROSS REFERENCES TO RELATED APPLICATIONS

Not applicable.

BACKGROUND

1. Field of Invention

The present invention relates to the measurement of spatial dimensions of gap openings between door edges and door frame components to determine compliance with industry standards as set forth in construction codes and regulations.

2. State of the Art

The background art is characterized by U.S. Pat. Nos. 4,345,380; 6,862,815; 6,336,275; 6,807,777; 4,584,774; 5,129,153; 5,329,703; 5,471,759; 7,152,336; 6,308,429; 6,279,241; 6,901,672; 5,666,738; and 6,571,484; the disclosures of which patents and patent application are incorporated by reference as if fully set forth herein.

Non-patent background art is characterized on the following Internet pages: www.firedoorinspections.com; www.accurexmeasure.com/gap_&_flush.htm; www bojoinc.com/catalog/product_info.php?products_id=119; www.qualityelev.com/main/tool/dgap.htm; and www.spartantoolsales.com.

SUMMARY OF THE INVENTION

An embodiment of the present invention provides for the quick and accurate determination of building code compliance for all gap openings related to door installations. A device and method for determining compliance with building construction codes comprises a block of material with a plurality of planar measuring surfaces separated by appropriate distances that are representative of a maximum or minimum gap opening between a door and an adjacent structure, as permitted by industry standards. The appropriate measuring surfaces are inserted in the gap opening between the door and adjacent structure to be tested and quickly and easily indicate whether the gap meets building construction codes. The device functions as one tool to quickly check compliance of all gap openings related to door installations without hindrance from door installation hardware.

BRIEF DESCRIPTION OF THE DRAWINGS

FIG. 8 shows another embodiment of the invention with tactile locator markers.

FIG. 9A shows a left elevation view of the invention with additional tactile locator markers.

FIG. 9B shows a top elevation view of the invention with additional tactile locator markers.

FIG. 10 shows an additional embodiment of the invention with generic measurement indicia and tactile locator markers.

FIG. 11 shows the additional embodiment of the invention with an instructional label attached to the rear of the invention.

FIG. 17A shows a top view of one embodiment of the invention being used to check the minimum clearance between the inactive door and the active door of a double door unit configured for left hand operation.

FIG. 17B shows a top view of one embodiment of the invention being used to check the maximum clearance of the double door unit shown in FIG. 17A.

FIG. 18 shows a top view of one embodiment of the invention being used near the door handle and latch of a single door unit configured for left hand operation.

FIG. 19 shows a top view of one embodiment of the invention being used on the door lock side of a single door unit, configured for left hand operation, where an intumescent smoke seal has been installed.

FIG. 20 shows a perspective view of one embodiment of the invention being used on the hinge side of a single or double door unit.

FIG. 21A shows a front elevation view of one embodiment of the invention being used on the hinge side of a single or double door unit.

FIG. 21B shows a top view of one embodiment of the invention being used to check the minimum clearance on the hinge side of a single door unit or double door unit.

DETAILED DESCRIPTION

One Embodiment—FIGS. 1-7, 11

FIGS. 1-7, and 11 illustrate a door gap gauge 1 that allows for quick and accurate determination of building code compliance for all gap openings related to door installations in accordance with the invention. In one embodiment, door gap gauge 1 was a rectangular block supplying six commonly used gap opening measurement standards, although more or less measurement standards could be supplied, and an attachment means, the entire door gap gauge 1 measuring 3 inches long by 2.5 inches wide, with a maximum thickness of ⅜ inches. For this embodiment, door gap gauge 1 preferably is made from Polyamide (Nylon) 6/6 using an injection molding process, but alternatively can be made from other durable materials such as metal, other plastics, wood, or other materials, using alternative manufacturing processes such as conventional machining, e.g., cutting, milling, or lathing; wire electrical discharge machining (wire EDM); chemical etching machining; abrasive water jet machining; or laser machining, e.g., Stereolithography (SLA), Selective Laser Sintering (SLS), or laser cutting; to name a few.

Figure 1:
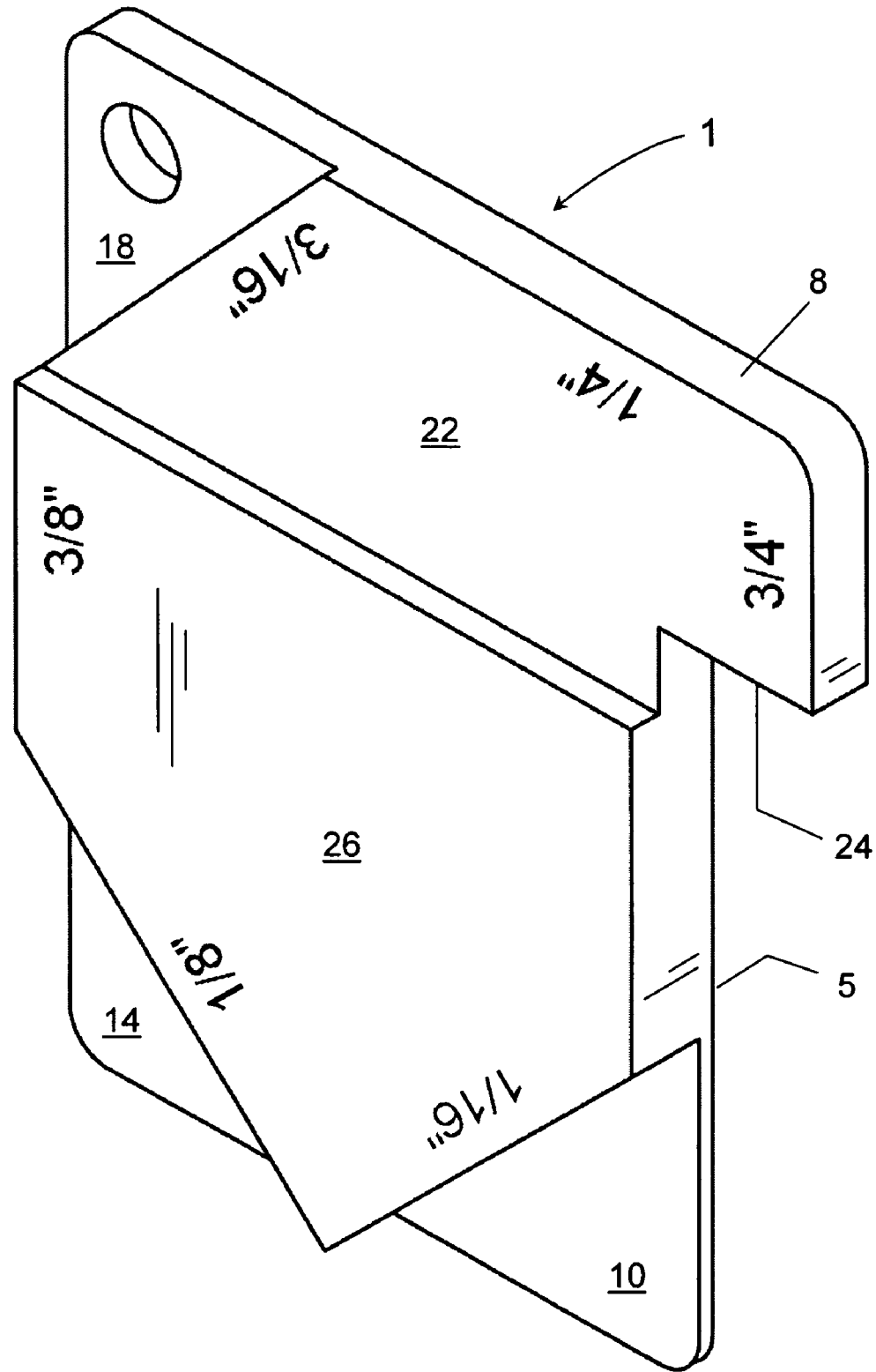
FIG. 1 shows a perspective view of an exemplary embodiment of the invention.
Figure 3:
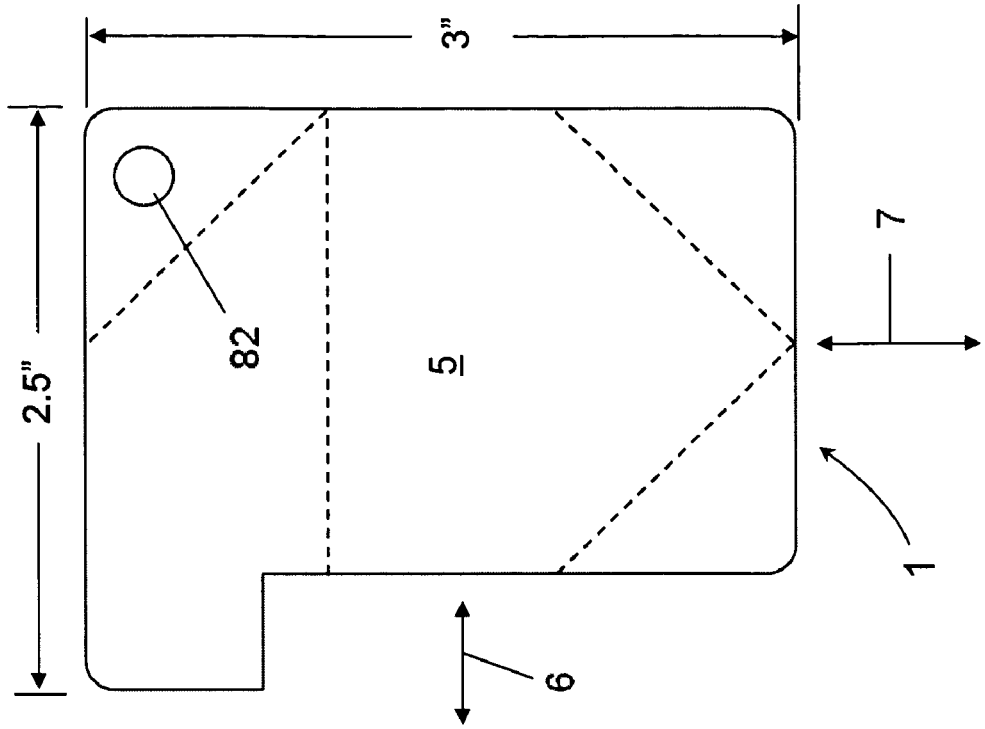
FIG. 3 is a rear elevation view of an exemplary embodiment of the invention.
Figure 2:
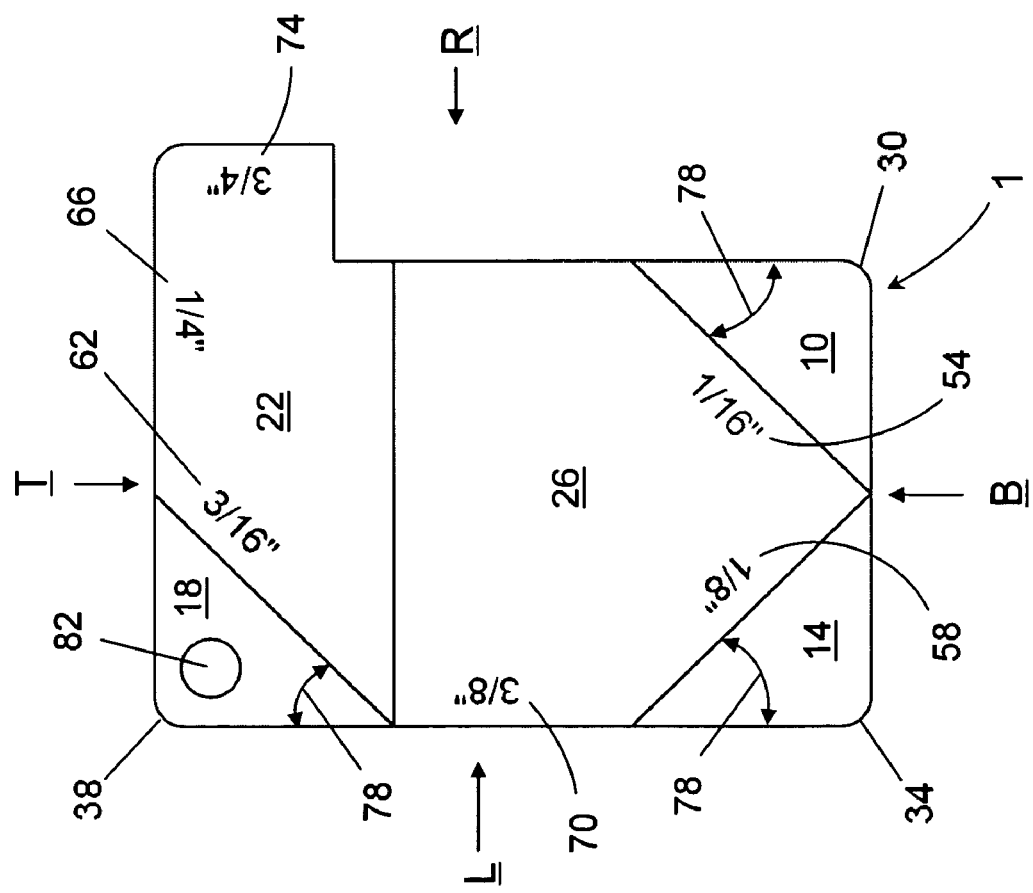
FIG. 2 is a front elevation view of an exemplary embodiment of the invention.
Figure 4:
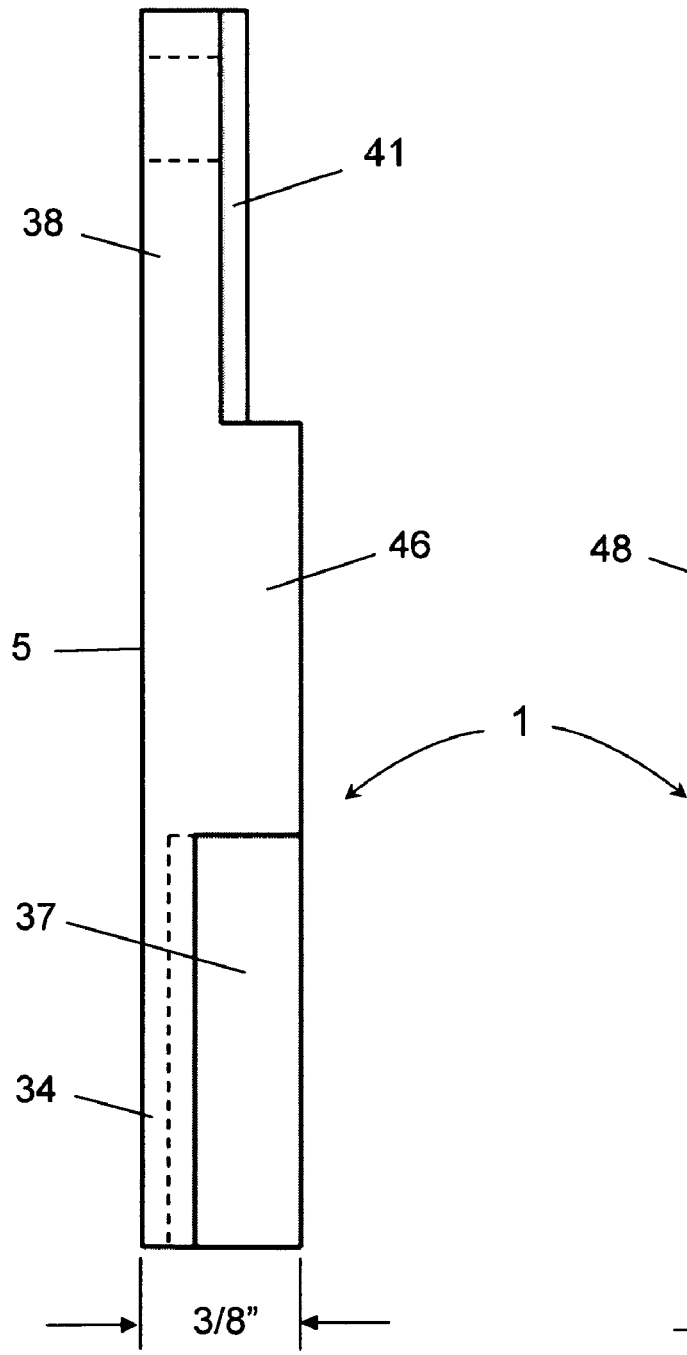
FIG. 4 is a left elevation view of an exemplary embodiment of the invention.
Figure 5:
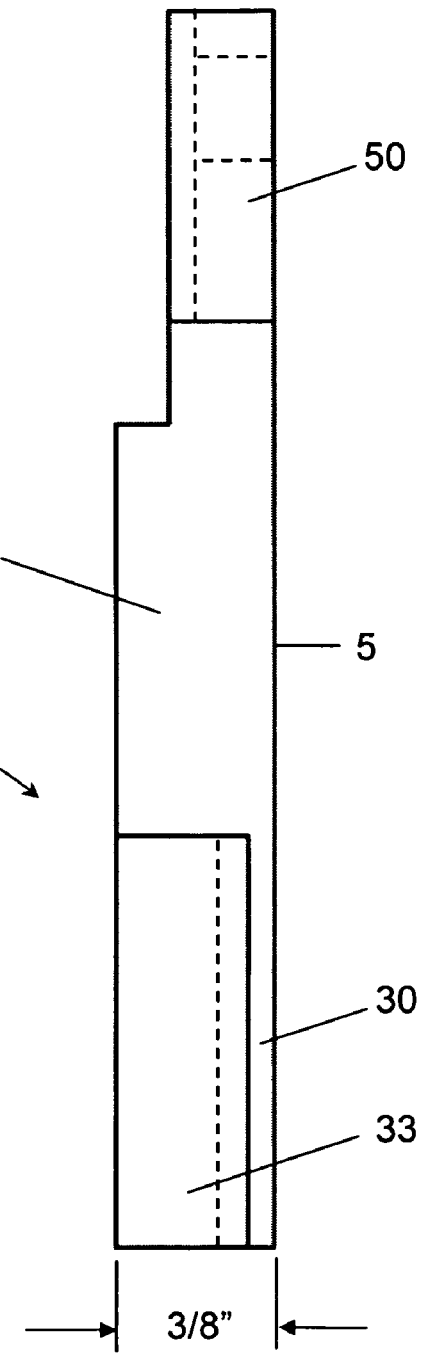
FIG. 5 is a right elevation view of an exemplary embodiment of the invention.
Figure 6:
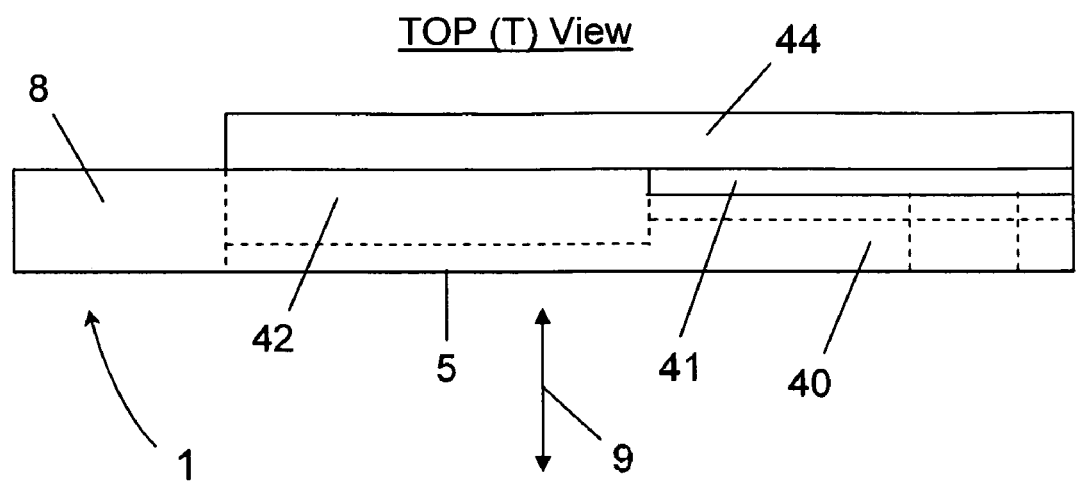
FIG. 6 is a top view of an exemplary embodiment of the invention.
Figure 7:
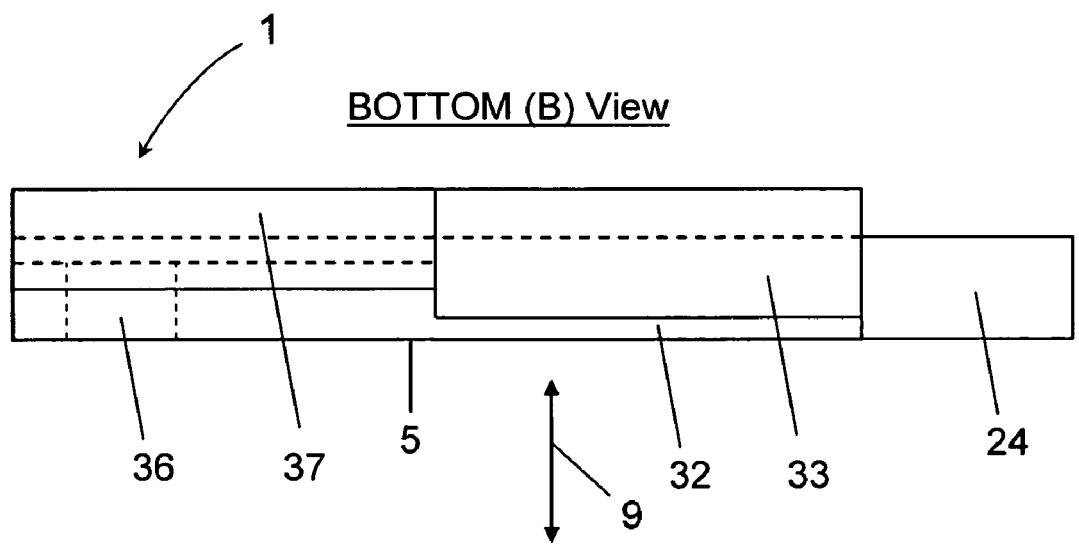
FIG. 7 is a bottom view of an exemplary embodiment of the invention.
Figure 12:
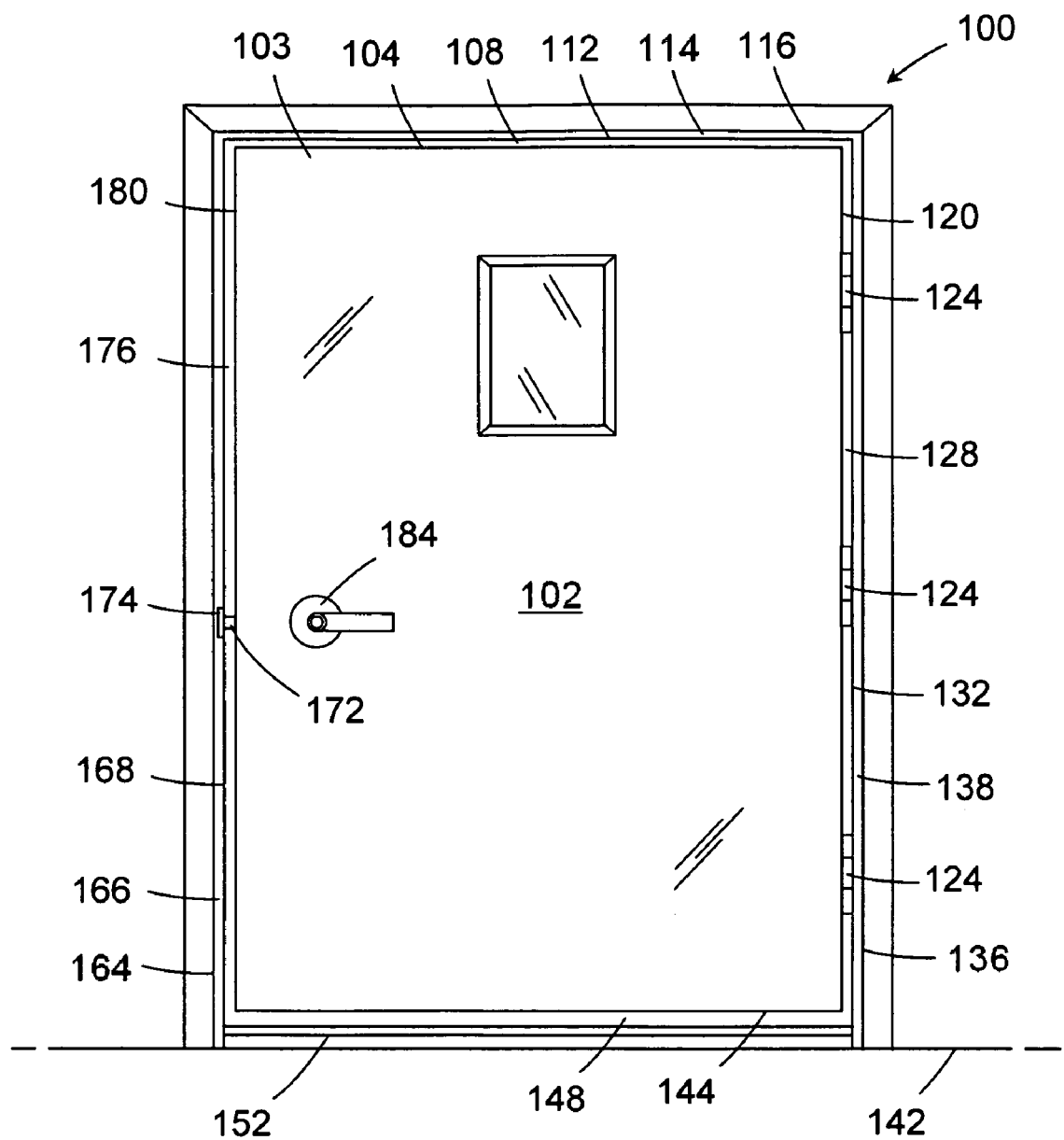
FIG. 12 shows a single door unit describing standard industry nomenclature.
Figure 13:
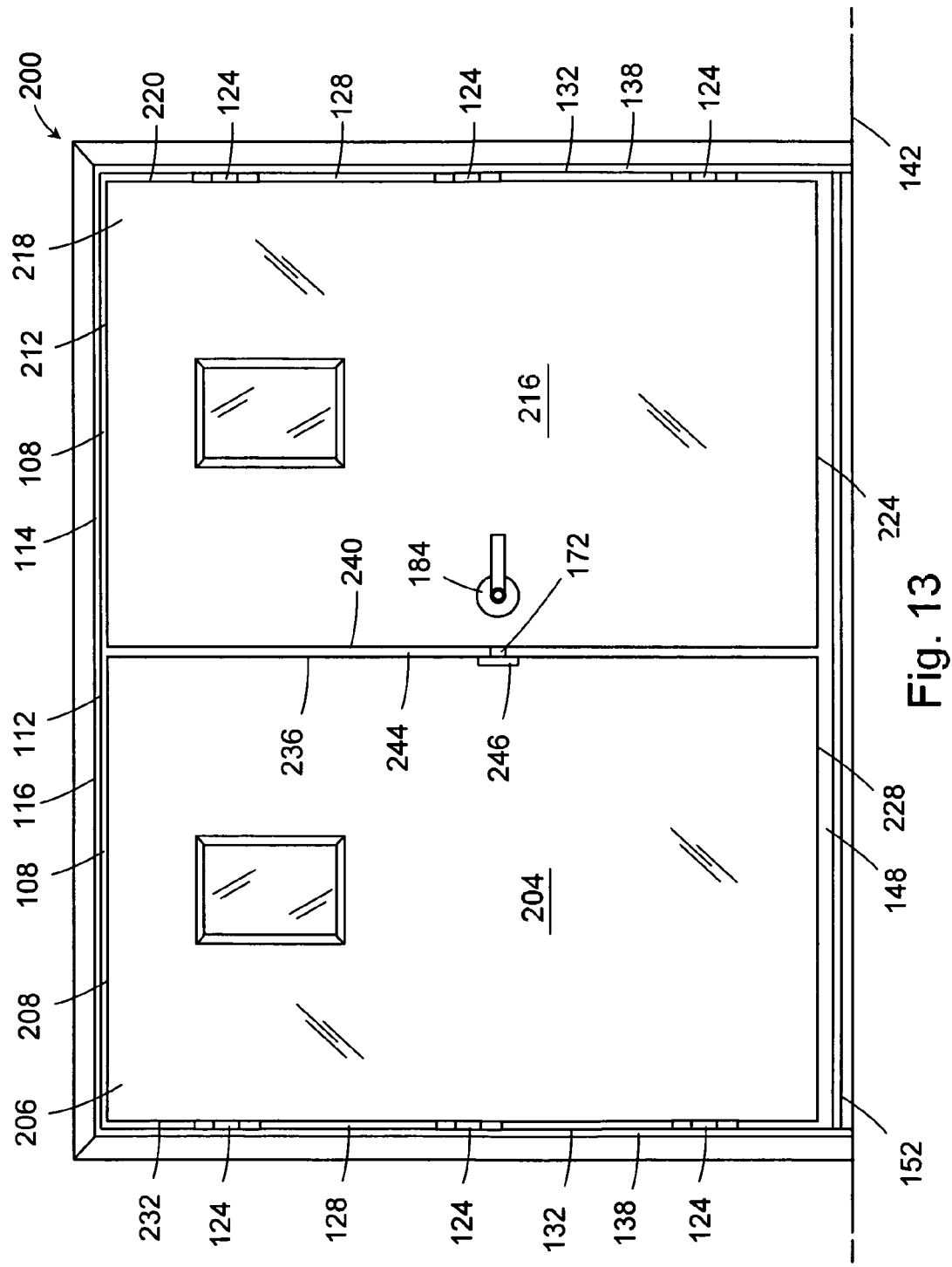
FIG. 13 shows a double door unit describing standard industry nomenclature.

For this embodiment an injection molding process is used to precisely produce accurate parallelism between a first planar reference base 5 and a plurality of first planar measuring surfaces 10, 14, 18, 22, and 26, which are the measuring surfaces for measurements ¹⁄₁₆", ⅛", ³⁄₁₆", ¼", and ⅜", respectively; and between a second planar reference base 8 and a second planar measuring surface for ¾" 24. As seen in FIGS. 4-7, the various measuring surfaces 10, 14, 18, 22, and 26, are connected directly or indirectly to first reference base 5 by a plurality of connecting surfaces 30 and 32; 34 and 36; 38 and 40; 42; and 46 and 48, for measurements ¹⁄₁₆", ⅛", ³⁄₁₆", ¼", and ⅜", respectively, where the connecting surfaces are shown normal to the measuring surfaces and first reference base 5, although the connecting surfaces do not have to be normal to the measuring surfaces and first reference base 5. Measuring surface 24 is connected directly or indirectly to second reference base 8 by a connecting surface for ¾" 50, which is normal to measuring surface 24 and to second reference base 8 (although the connecting surface does not have to be normal to measuring surface 24 and second reference base 8). As shown in FIG. 2, ¹⁄₁₆" measuring surface 10 is further formed by removing the appropriate amount of measuring surface 26 material at 45-degree angle 78 from connecting surface 48, while ⅛" measuring surface 14 is further formed by removing the appropriate amount of measuring surface 26 material at a 45-degree angle 78 from connecting surface 46. ³⁄₁₆" measuring surface 18 is further formed by removing the appropriate amount of measuring surface 22 material at 45-degree angle 78 from connecting surface 46. These 45-degree angle formations provide for equal surface measurement areas for gap measurements ¹⁄₁₆", ⅛", and ³⁄₁₆", although other material removal angles could be used. All measuring surfaces 10, 14, 18, 22, and 26, are within the projected area of first reference base 5; while measuring surface 24 is within the projected area of second reference base 8.

An attachment aperture 82 is provided for attaching door gap gauge 1 to another object, such as a key ring. For this embodiment, attachment aperture 82 is circular in shape and approximately 0.25" in diameter, although other diameters and shapes could be used.

A plurality of measurement indicia 54, 58, 62, 66, 70, and 74 representing measurement values of ¹⁄₁₆", ⅛", ³⁄₁₆", ¼", ⅜" and ¾", respectively, are provided to indicate the thickness of connecting surfaces 30 and 32; 34 and 36; 38 and 40; 42; 46 and 48; and 50, respectively, and further indicate the measurement widths represented by measuring surfaces 10, 14, 18, 22, 26, and 24, respectively. In this embodiment, as shown in FIG. 2, measurement indicia 54, 58, 62, 66, 70, and 74 are provided in fractional inches, although other measurement units, such decimal inches, millimeters (mm) or centimeters (cm), may be used, to name a few.

For this embodiment, the surface of the finished door gap gauge 1 will have a hardness of R(M)=85-95, although other materials with different hardnesses, and hardness measurements, may be used as long as the finished surface has a suitable resistance to deformation, scratching, abrasion, marring, or cutting when used in the intended application.

Optionally, as shown in FIG. 11, door gap gauge 1 may include a first instruction label 86, mounted in a first recessed area 90 on first reference base 5 so that the surface of label 86 is below the surface of reference base 5.

Another Embodiment—FIGS. 8, 9A, and 9B

In another embodiment, a door gap gauge 300 is shown in FIG. 8 with the addition of a plurality of tactile locator marker groups 302, 304, 308, 312, 316, and 320 providing the user with a tactile indication of measuring surfaces 10, 14, 18, 22, 26, and 24, for measurements ¹⁄₁₆", ⅛", ³⁄₁₆", ¼", ⅜", and ¾", respectively. For this embodiment, each tactile locator marker group 302, 304, 308, 312, 316, and 320 includes a tactile directional marker 324 and a subgroup of gap measurement markers 330, 334, 338, 342, 346, and 350, indicating measurements ¹⁄₁₆", ⅛", ³⁄₁₆", ¼", ⅜", and ¾", respectively. Tactile directional marker 324 is positioned normal to each subgroup of gap measurement markers at an adequate distance such that a user's finger can discern tactile directional marker 324. For this embodiment, tactile locator marker groups 302, 304, 308, 312, 316, and 320 are shown as raised dome shapes, where each raised dome is optimally approximately 0.05-inches in height, although other height distances could be used as long as the tactile touch of the finger can discern the raised dome shapes. Alternatively, tactile locator markers could be raised cylindrical, square or rectangular shapes, to name a few. The horizontal and vertical spacing between raised domes is optimally approximately 0.1-inches, although other spacing distances could be used as long as the tactile touch of the finger can discern the raised dome shapes.

Attachment aperture 82 is provided for attaching door gap gauge 300 to another object, such as a key ring. For this embodiment, attachment aperture 82 is circular in shape and approximately 0.25" in diameter, although other diameters and shapes could be used.

Additional Embodiment—FIG. 10

In an additional embodiment, a door gap gauge 400 is shown in FIG. 10 with a plurality of measurement indicia 454, 458, 462, 466, 470, and 474 representing measurement values for a plurality of measuring surfaces 410, 414, 418, 422, 426 and 428, respectively. Measurement indicia 454, 458, 462, 466, 470, and 474 provide a more general indication of measurement widths represented by measuring surfaces 410, 414, 418, 422, 426 and 428, respectively, which can be provided in various measurement units, such as fractional inches, decimal inches, millimeters, or centimeters, to name a few, in order to meet the desired code standard.

For this embodiment, as shown in FIG. 10, a plurality of tactile locator markers 478, 480, 482, 484, 486, and 488 provides the user with a tactile indication of the measuring surfaces 410, 414, 418, 422, 426 and 428, respectively. For this embodiment, tactile locator markers 478, 480, 482, 484, 486, and 488 are shown as raised dome shapes, but alternatively could be raised cylindrical, square or rectangular shapes, to name a few.

Although not shown, optionally, door gap gauge 400 may include a second instruction label 404, similar to first instruction label 86, where text indicating measuring surfaces for door gap gauge 1 are replaced with text indicating measuring surfaces 1, 2, 3, 4, 5, and 6 for door gap gauge 400. Similar to first instruction label 86, second instruction label 404 is mounted in a recessed area on first reference base 5 so that the surface of second instruction label 404 is below the surface of reference base 5.

Attachment aperture 82 is provided for attaching door gap gauge 400 to another object, such as a key ring. For this embodiment, attachment aperture 82 is circular and approximately 0.25" in diameter, although other diameters and shapes could be used.

Detailed Operation of the Embodiments

FIGS. 12-27

FIGS. 12 to 27 illustrate the method of using door gap gauge 1 for quick and accurate determination of building code compliance of all gap openings related to door installations, although door gap gauge 300 and door gap gauge 400 can be used in a similar manner. The National Fire Protection Association (NFPA) and the American National Standards Institute/international Code Council (ANSI/ICC) maintain the ANSI/NFPA 80 standard ("Standard for Fire Doors and Fire Windows"), and ANSI/NFPA 252 Standard ("Standard Methods of Fire Tests of Door Assemblies"), which codify and reference standards for fire doors and fire windows. Based on these current standards, the following method presents all measurement units in fractional inches, although other measurement units, such as decimal inches, millimeters (mm) or centimeters (cm), may be used, to name a few, depending on a particular standard (e.g., updated standards, International standards, etc.).

For example, federal and state building codes, citing ANSI/NFPA 80 and 252 standards, require that for both a single door unit 100 and a double door unit 200, a strike jamb gap 176, a hinge side gap 128, and a top gap 108 have a width measuring no more than ⅛-inch, with a tolerance of no less than 1/16-inch, e.g., 1/16" (minimum) to ⅛" (maximum). Further, for wooden double door units, a double door gap 244 must have a width measuring no more than ⅛-inch, with a tolerance of no less than 1/16-inch, e.g., 1/16" (minimum) to ⅛" (maximum). For metal double door units, double door gap 244 must have a width measuring ⅛-inch, with a tolerance of no less than 1/16-inch or no more than 1/16-inch, e.g., 1/16" (minimum) to 3/16" (maximum).

Clearance along the bottom of the door depends on the presence or absence of a noncombustible floor surface 140 and/or a threshold-sill unit 152, both considered components of a single door unit 100 and a double door unit 200 for this invention. If noncombustible floor surface 140 is present, and extends through the door opening (e.g., on both sides of single door unit 100 or double door unit 200), threshold-sill unit 152 is not required. For this case a bottom gap 148 must have a height measuring no more than ¾-inch, as measured to noncombustible floor surface 140, for both the single door unit 100 and double door unit 200.

If a combustible floor surface 142 is present, threshold-sill unit 152, which is commonly constructed of non-combustible materials, is required because combustible floor construction shall not be permitted to extend through the door opening. Note that combustible floor surface 142 is considered a component of a single door unit 100 and a double door unit 200 for this invention. For single door unit 100 and double door unit 200, with threshold-sill unit 152 installed, bottom gap 148 clearance height must be no more than ⅜-inch as measured to a sill top surface 153 of threshold-sill unit 152. The presence of threshold-sill unit 152 also affects federal and state building codes with regards to individuals with physical disabilities as cited by the International Code Council (ICC)/ANSI A117.1-2003 standard, entitled "American National Standard: Accessible and Usable Buildings and Facilities" and the "Americans with Disabilities Act (ADA)" regulations. To meet these standards, threshold-sill unit 152 cannot cause changes in level (height) greater than ½" (while also being beveled with a slope not steeper than 1:2 for heights between ¼" and ½"). When combined with ANSI/NFPA 80 and 252 standards, this requires a maximum bottom clearance of ¼" (¾" minus ½") for the above condition.

FIGS. 12-16

Checking the Strike Jamb Gap—Single Door Unit

Figure 14B:
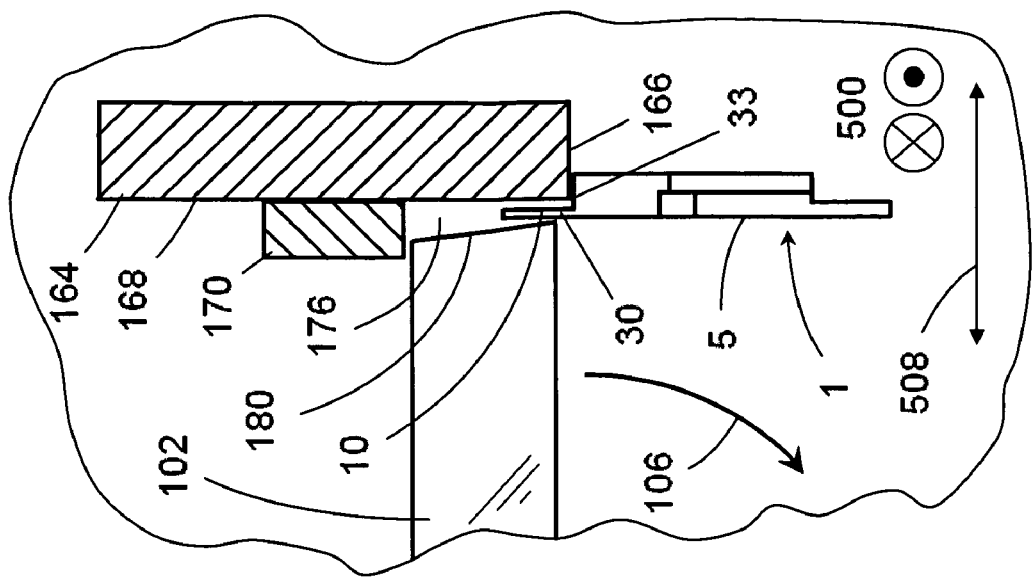
FIG. 14B shows a top view of one embodiment of the invention being used in FIG. 14A.
Figure 14A:
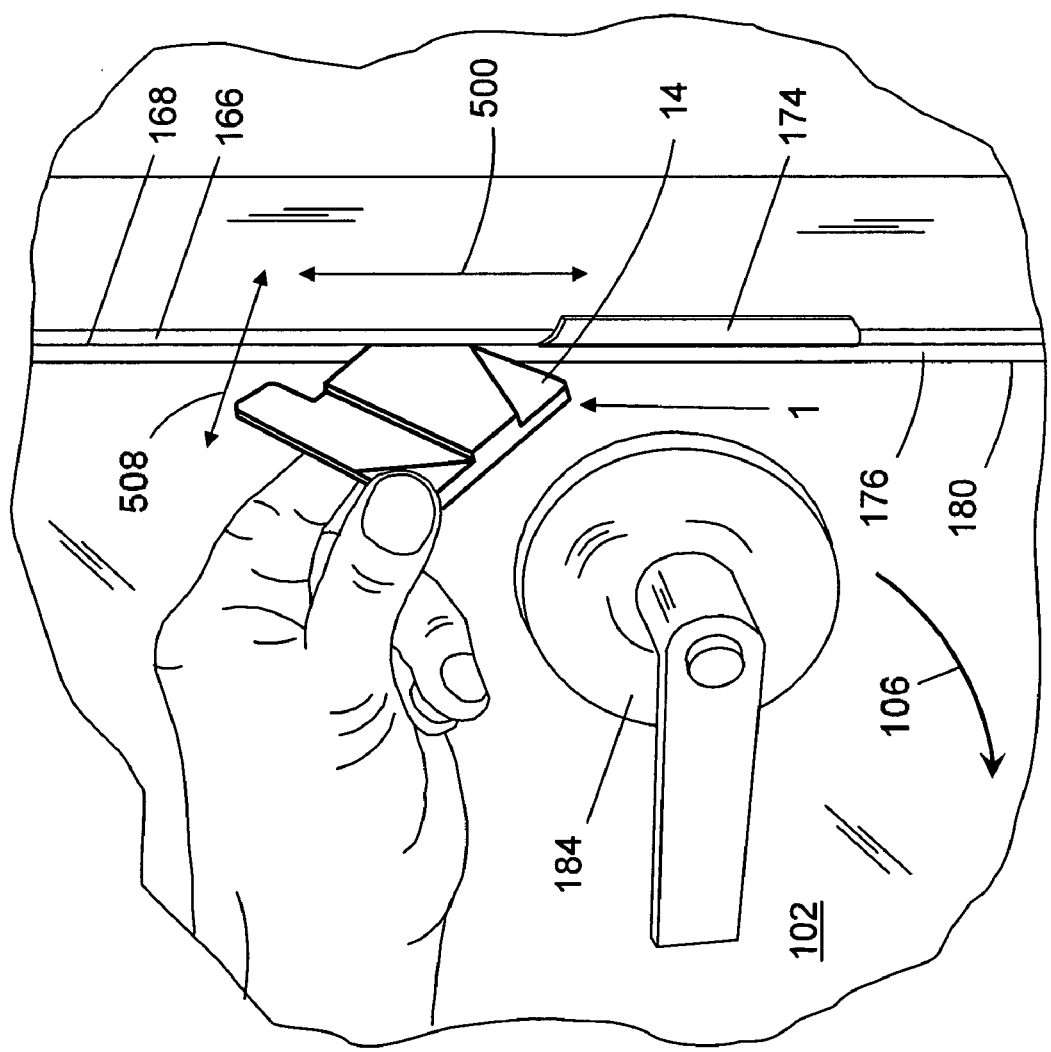
FIG. 14A shows a perspective view of one embodiment of the invention being used to check the minimum gap distance near the door handle of a single door unit, configured for right hand operation.

In one method, as shown in FIGS. 14A, 14B, 15A and 15B, door gap gauge 1 is being used to check strike jamb gap 176 clearance for a single door unit 100 made from wood, metal, or other materials. In this method, door gap gauge 1 is used to first check the minimum clearance requirement by utilizing measuring surface 1/16" 10, as shown in FIGS. 14A and 14B, which represents a right hand door configuration. First, door gap gauge 1 is inserted such that first reference base 5 faces a door lock side edge 180, measuring surface 1/16" 10 faces a strike jamb edge 168, and a contact surface for 1/16" 33 engages a strike jamb face 166 (although engagement is not necessary for device to function correctly). If door gap gauge 1 cannot be inserted in this manner, strike jamb gap 176 clearance fails since strike jamb gap 176 is less than 1/16-inch wide. If door gap gauge 1 can be inserted in this manner, at any location along strike jamb gap 176, the examination of the minimum strike jamb gap 176 clearance continues. Once inserted, lateral pressure is applied such that first reference base 5 is substantially engaged with door lock side edge 180 (alternately, lateral pressure could be applied such that measuring surface 1/16" 10 is substantially engaged with strike jamb edge 168). While maintaining lateral pressure, door gap gauge 1 is then moved in a first measuring direction 500, which is either in the up direction or the down direction for strike jamb gap 176 clearance (shown as going in and out of the drawing in FIG. 14B). If, while moving door gap gauge 1 in first measuring direction 500, strike jamb gap 176 clearance is less than 1/16-inch, door gap gauge 1 movement will stop, indicating a strike jamb gap 176 clearance failure. Door gap gauge 1 is removed from strike jamb gap 176 at this location and reinserted into strike jamb gap 176 (as described above) just past the failed narrow area, and the procedure continues for the minimum clearance check in order to further define any other failure areas, if they exist. If, while moving door gap gauge 1 in first measuring direction 500, strike jamb gap 176 clearance is greater than 1/16-inch, door gap gauge 1 movement will not stop, indicating strike jamb gap 176 clearance is adequate for the minimum clearance specification.

Figure 15B:
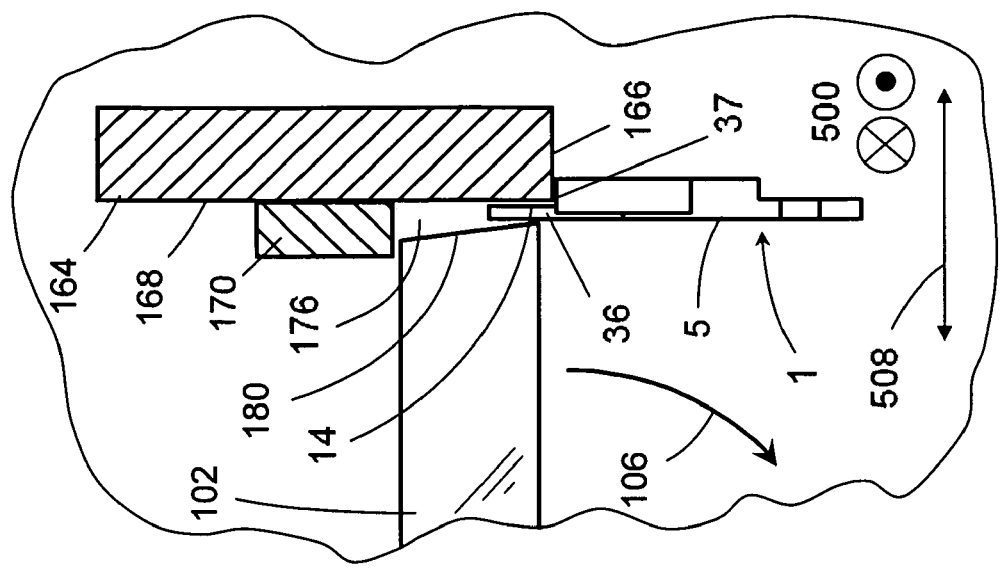
FIG. 15B shows a top view of one embodiment of the invention being used in FIG. 15A.
Figure 15A:
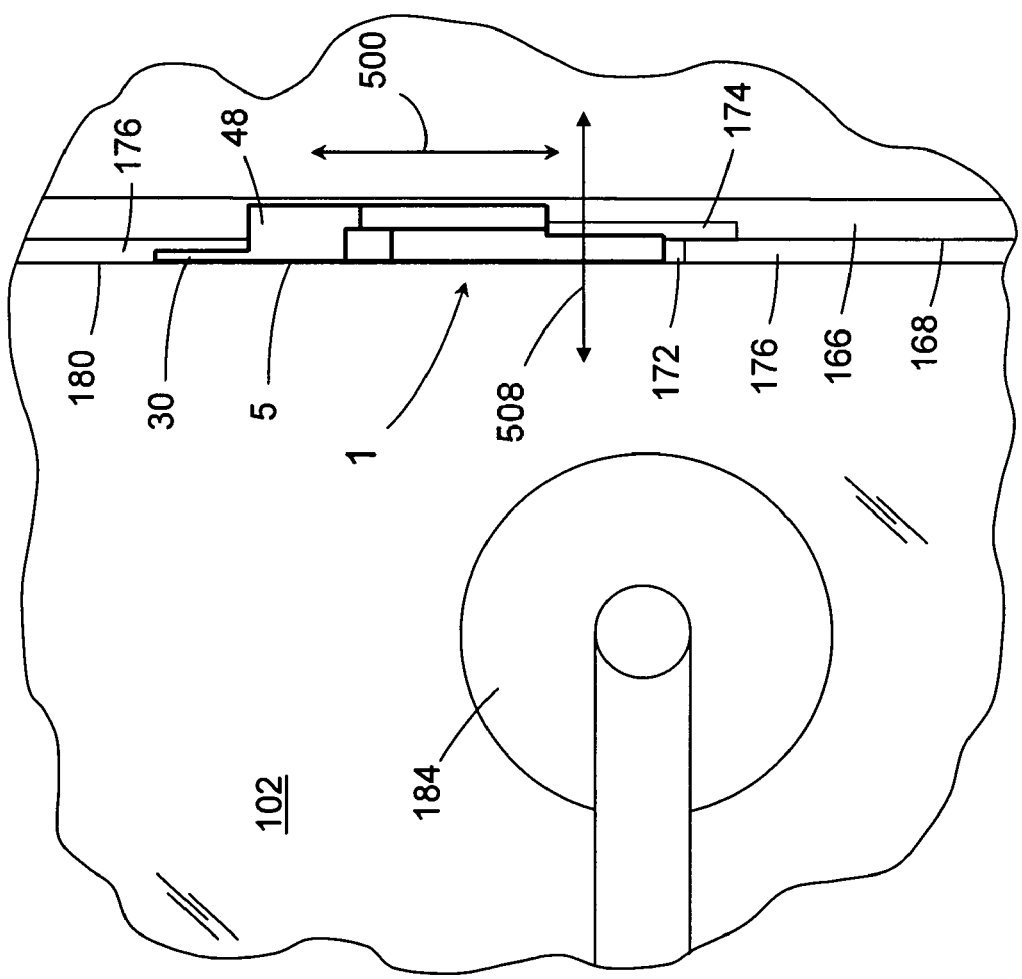
FIG. 15A shows a front elevation view of one embodiment of the invention being used near the door handle to check the maximum gap distance.

Once the minimum strike jamb gap 176 clearance is checked, door gap gauge 1 is then used to check the maximum clearance requirement for strike jamb gap 176 by utilizing measuring surface 1/8" 14. As seen in FIGS. 15A and 15B (which shows a top view of FIG. 15A), door gap gauge 1 is simply rotated 90-degrees in a counterclockwise direction about a z-axis 9, and then is inserted such that first reference base 5 faces door lock side edge 180, measuring surface 1/8" 14 faces strike jamb edge 168, and a contact surface for 1/8" 37 engages a strike jamb face 166 (although engagement is not necessary for device to function correctly). Once inserted, reference base 5 should engage door lock side edge 180 and measuring surface 1/8" 14 should engage strike jamb edge 168, such that door gap gauge 1 cannot move significantly in a lateral direction 508, while still allowing door gap gauge 1 to move in first measuring direction 500 (shown as going in and out of the drawing in FIG. 15B). Once inserted, lateral pressure is applied such that first reference base 5 is substantially engaged with door lock side edge 180 (alternately, lateral pressure could be applied such that measuring surface 1/8" 14 is substantially engaged with strike jamb edge 168). Door gap gauge 1 is then moved in first measuring direction 500, which is either in the up direction or the down direction for strike jamb gap 176 clearance. If, while moving door gap gauge 1 in first measuring direction 500, strike jamb gap 176 clearance is less than 1/8-inch, door gap gauge 1 movement will stop. At this location, strike jamb gap 176 clearance is sufficient if the minimum clearance check for this area has already passed. Door gap gauge 1 is removed from strike jamb gap 176 at this location and reinserted into strike jamb gap 176 (as discussed above) just past the narrow area, and the procedure continues for the maximum clearance check. If, while moving door gap gauge 1 in first measuring direction 500, strike jamb gap 176 clearance is greater than 1/8-inch, measuring surface 1/8" 14 will disengage from strike jamb edge 168, (or reference base will disengage from lock side edge 180, depending on the direction of applied lateral pressure as discussed above), that is, door gap gauge 1 is allowed to move in a lateral direction 508, indicating a strike jamb gap 176 clearance failure. The strike jamb gap 176 maximum clearance check may continue at other areas along the strike jamb gap 176 in order to further define any other failure areas, if they exist.

In another method for checking strike jamb gap 176 clearance, the maximum clearance requirement may be checked first, as described above, followed by checking the minimum requirement as described above, that is, the methodology discussed above is performed in reverse order (where door gap gauge 1 is rotated 90-degrees in a clockwise direction about a z-axis 9 when changing from the maximum check to the minimum check).

Figure 16:
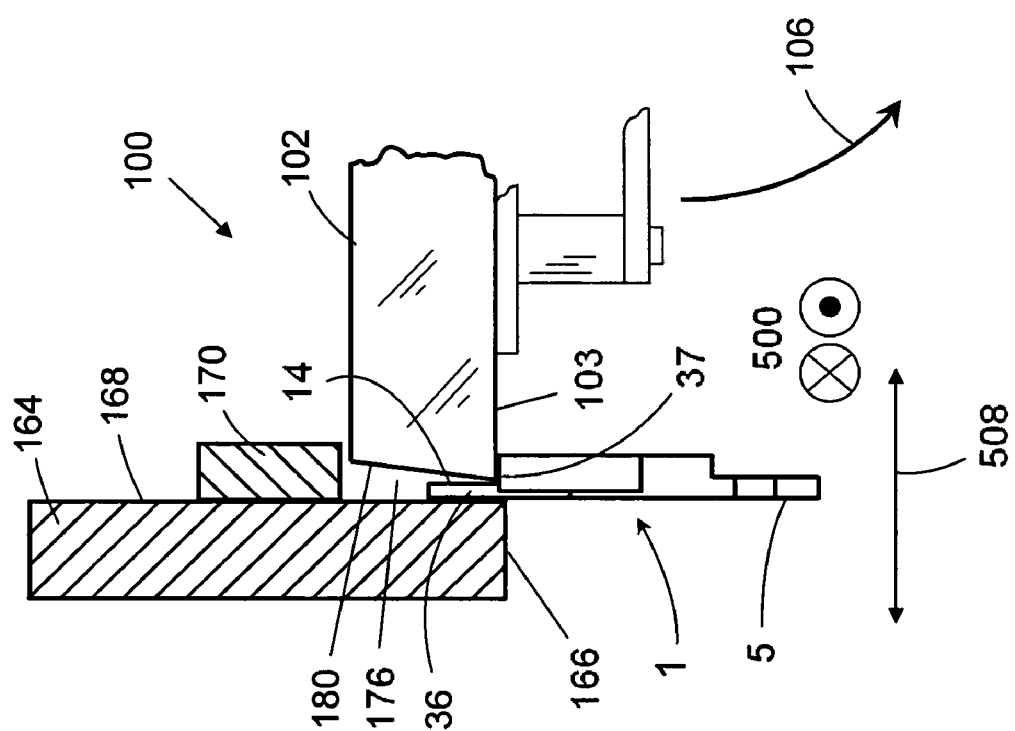
FIG. 16 shows a top view of one embodiment of the invention in an alternate, rotated position being used on the door lock side of a single door unit configured for left hand operation.

Either method discussed above for checking strike jamb gap 176 clearance may be implemented in an alternate method by rotating door gap gauge 1 by 180-degrees about a y-axis 7 (see FIG. 3), in either a clockwise or counterclockwise direction, and inserting door gap gauge 1 into strike jamb gap 176. FIG. 16 is a top view of a left hand door configuration describing the rotated door gap gauge 1 when used in the maximum clearance check. As the rotated door gap 1 is inserted, first reference base 5 faces strike jamb edge 168, measuring surface 1/8" 14 faces door lock side edge 180, and contact surface for 1/8" 37 engages a single door face 103 (although engagement is not necessary for device to function correctly). The methods described above for the maximum clearance check are then repeated to verify adequate clearance. For the minimum clearance check, although not shown, door gap gauge 1 is simply rotated by 90-degrees in a clockwise direction about z-axis 9, and then is inserted such first reference base 5 faces strike jamb edge 168, measuring surface 1/16" 10 faces door lock side edge 180, and contact surface for 1/16" 33 engages single door face 103 (although engagement is not necessary for device to function correctly). The methods described above for the minimum clearance check are then repeated to verify adequate clearance.

FIGS. 17A and 17B

Checking the Double Door Gap—Double Door Unit

In one method for checking double door gap 244 clearance for wooden doors, as shown in FIG. 17A, which shows a top view, door gap gauge 1 is used to first check the minimum requirement by utilizing measuring surface 1/16" 10. First, door gap gauge 1 is inserted such that first reference base 5 faces an inactive door strike side edge 236, measuring surface 1/16" 10 faces an active door lock side edge 240, and contact surface for 1/16" 33 engages an active door face 218 (although engagement is not necessary for device to function correctly). If door gap gauge 1 cannot be inserted in this manner, double door gap 244 clearance fails since the double door gap 244 is less than 1/16-inch wide. If door gap gauge 1 can be inserted in this manner, at any location along double door gap 244, the examination of the minimum double door gap 244 clearance continues. Once inserted, lateral pressure is applied such that first reference base 5 is substantially engaged with inactive door strike side edge 236 (alternately, lateral pressure could be applied such that measuring surface 1/16" 10 is substantially engaged with active door lock side edge 240). Door gap gauge 1 is then moved in first measuring direction 500, which is either in the up direction or the down direction for double door gap 244 clearance (shown as going in and out of the drawing in FIG. 17A). If, while moving door gap gauge 1 in first measuring direction 500, double door gap 244 clearance is less than 1/16-inch, door gap gauge 1 movement will stop, indicating a double door gap 244 clearance failure. Door gap gauge 1 is removed from double door gap 244 at this location and reinserted into double door gap 244 (as described above) just past the failed narrow area, and the procedure continues for the minimum clearance check in order to further define any other failure areas, if they exist. If, while moving door gap gauge 1 in first measuring direction 500, double door gap 244 clearance is greater than 1/16-inch, door gap gauge 1 movement will not stop, indicating double door gap 244 clearance is adequate for the minimum clearance specification.

Once the minimum double door gap 244 clearance for wooden doors is checked, door gap gauge 1 is then used to check the maximum clearance requirement for double door gap 244 by utilizing measuring surface ⅛" 14. As seen in FIG. 17B, which shows a top view, door gap gauge 1 is simply rotated by 90-degrees in a counterclockwise direction about z-axis 9, and then is inserted such that first reference base 5 faces inactive door strike side edge 236, measuring surface ⅛" 14 faces active door lock side edge 240, and contact surface for ⅛" 37 engages active door face 218 (although engagement is not necessary for device to function correctly). Once inserted, reference base 5 should engage inactive door strike side edge 236 and measuring surface ⅛" 14 should engage active door lock side edge 240, such that door gap gauge 1 cannot move significantly in a lateral direction 508, while still allowing door gap gauge 1 to move in first measuring direction 500 (shown as going in and out of the drawing in FIG. 17B). Once inserted, lateral pressure is applied such that first reference base 5 is substantially engaged with inactive door strike side edge 236 (alternately, lateral pressure could be applied such that measuring surface ⅛" 14 is substantially engaged with active door lock side edge 240). Door gap gauge 1 is then moved in first measuring direction 500, which is either in the up direction or the down direction for double door gap 244 clearance. If, while moving door gap gauge 1 in measuring direction 500, double door gap 244 clearance is less than ⅛-inch, door gap gauge 1 movement will stop. At this location, double door gap 244 clearance is sufficient if the minimum clearance specification for this area has already passed. Door gap gauge 1 is removed from double door gap 244 at this location and reinserted into double door gap 244 (as described above) just past the narrow area, and the procedure continues for the maximum clearance check. If, while moving door gap gauge 1 in measuring direction 500, double door gap 244 clearance is greater than ⅛-inch, measuring surface ⅛" 14 will disengage from active door lock side edge 240, (or reference base 5 will disengage from inactive door strike side edge 236, depending on the direction of applied lateral pressure as discussed above), that is, door gap gauge 1 is allowed to move in a lateral direction 508, indicating a double door gap 244 clearance failure (for wooden doors). The double door gap 244 clearance check may continue at other areas along the double door gap 244 in order to further define any other failure areas, if they exist.

Checking the minimum double door gap 244 clearance for metal doors is largely identical to that discussed above for wooden double doors, however, since current ANSI/NFPA specifications allow for a 3/16-inch maximum clearance for metal doors, an additional step is required. The method proceeds as above until double door gap 244 clearance is greater than ⅛-inch. At this location, measuring surface ⅛" 14 will disengage from active door lock side edge 240, (or reference base 5 will disengage from inactive door strike side edge 236, depending on the direction of applied lateral pressure as discussed above), that is, door gap gauge 1 is allowed to move in a lateral direction 508. Door gap gauge 1 is then reoriented, by simply rotating door gap gauge 1 by 90-degrees in a counterclockwise direction about z-axis 9, and then is inserted such that reference base 5 engages inactive door strike side edge 236, measuring surface for 3/16" 18 engages active door lock side edge 240, and a contact surface for 3/16" 41 engages active door face 218 (although engagement is not necessary for device to function correctly). If, while moving door gap gauge 1 in measuring direction 500, double door gap 244 clearance is less than 3/16-inch, door gap gauge 1 movement will stop. At this location, double door gap 244 clearance is sufficient if the minimum clearance specification for this area has already passed. If, while moving door gap gauge 1 in first measuring direction 500, double door gap 244 clearance is greater than 3/16-inch, measuring surface for 3/16" 18 will disengage from active door lock side edge 240, (or reference base 5 will disengage from inactive door strike side edge 236, depending on the direction of applied lateral pressure), that is, door gap gauge 1 is allowed to move in a lateral direction 508, indicating a double door gap 244 clearance failure (for metal doors). The double door gap 244 clearance check may continue at other areas along the double door gap 244 in order to further define any other failure areas, if they exist.

In another method for checking double door gap 244 clearance, the maximum clearance requirement may be checked first as described above, followed by checking the minimum clearance requirement as described above, that is, the methodology discussed above is performed in reverse order (where door gap gauge 1 is rotated 90-degrees in a clockwise direction about a z-axis 9 when changing from the maximum clearance check to the ⅛" nominal clearance check to the minimum clearance check, respectively).

In the methods discussed above for checking double door gap 244 clearance an alternate method may be implemented by rotating door gap gauge 1 by 180-degrees about y-axis 7, in either a clockwise or counterclockwise direction, and inserting door gap gauge 1 into double door gap 244. For this method, first reference base 5 faces active door lock side edge 240; measuring surface 1/16" 10, measuring surface ⅛" 14, and measuring surface for 3/16" 18 face active door lock side edge 240, during respective components of the procedure using these measuring surfaces; and contact surface for 1/16" 33, contact surface for ⅛" 37, and contact surface for 3/16" 41 engage an inactive door face 206 (although engagement is not necessary for device to function correctly), during respective components of the procedure using these contact surfaces. Clearance checks then proceed as defined above.

FIGS. 18 and 19

Checking Gaps in Vicinity of Door Hardware

FIG. 18 shows a top view of the situation the door gap gauge 1 is used near a door latch 172. In this figure, door gap gauge 1 is currently checking for the maximum clearance, that is, measuring surface ⅛" 14 is shown positioned in strike jamb gap 176, although the method applies to minimum clearance checking as well, using appropriate measuring surfaces. In this example, door gap gauge 1 is being moved from the top of a single door 102 toward the bottom of single door 102 in first measuring direction 500 (although door gap gauge 1 could be moved in the other direction, from bottom to top, as well). In this method, as door gap gauge 1 approaches door latch 172, first connecting surface for ⅛" 34 engages the top surface of door latch 172. At this location, door gap gauge 1 is pulled outward, perpendicular to single door face 103, until first connecting surface for ⅛" 34 just disengages from the top surface of door latch 172. First reference base 5 and measuring surface ⅛" 14 are still positioned within strike jamb gap 176, and the maximum clearance check continues downward past door latch 172. Once past door latch 172, if desired, door gap gauge 1 may be reinserted fully in strike jamb gap 176 until contact surface for ⅛" 37 engages single door face 103. The maximum clearance check procedure continues as before.

In another method door gap gauge 1 may be initially positioned such that first connecting surface for ⅛" 34 never engages the top surface of door latch 172 as door gap gauge 1, positioned within strike jamb gap 176, is moved along first measuring direction 500 along the entire length of single door 102. That is, door gap gauge 1 is not fully inserted in strike jamb gap 176, but first reference base 5 and measuring surface ⅛" 14 are still positioned within strike jamb gap 176 allowing for clearance checking.

Although not shown, in yet another method, door gap gauge 1 can be rotated by 180-degrees about y-axis 7, in either a clockwise or counterclockwise direction; inserted into strike jamb gap 176; and moved along first measuring direction 500, while avoiding door latch 172, as discussed just above for measuring minimum or maximum clearance.

FIG. 19 shows a top view of the situation when door gap gauge 1 is used near an intumescent smoke seal 254, which typically is installed along the entire length of a strike jamb 164, a hinge jamb 136, and a head jamb 116. For this example, door gap gauge 1 is currently checking for the maximum clearance, that is, measuring surface ⅛" 14 is shown positioned in strike jamb gap 176, although the method applies to minimum clearance checking as well, using appropriate measuring surfaces. For this method, door gap gauge 1 is inserted until first connecting surface for ⅛" 34 just engages intumescent smoke seal 254, while first reference base 5 and measuring surface ⅛" 14 are still positioned within strike jamb gap 176 allowing clearance checking. Clearance checking now proceeds as described in the CHECKING THE STRIKE JAMB GAP section above. The above procedures, although not shown in the figures, apply when other door hardware may be present (such as deadbolts, weather seals, etc.). That is, door gap gauge 1 is capable of gap measurement checking in a variety of situations.

Additionally, the above procedures apply to double door gap 244 clearance check where door latch 172, intumescent smoke seal 254, or other hardware may be present, such as deadbolts, weather seals, astragals, etc., that is, door gap gauge 1 is capable of gap measurement checking in a variety of situations.

FIGS. 20, 21A, 21B, 21C, and 21D

Checking the Hinge Side Gap

Figure 21C:
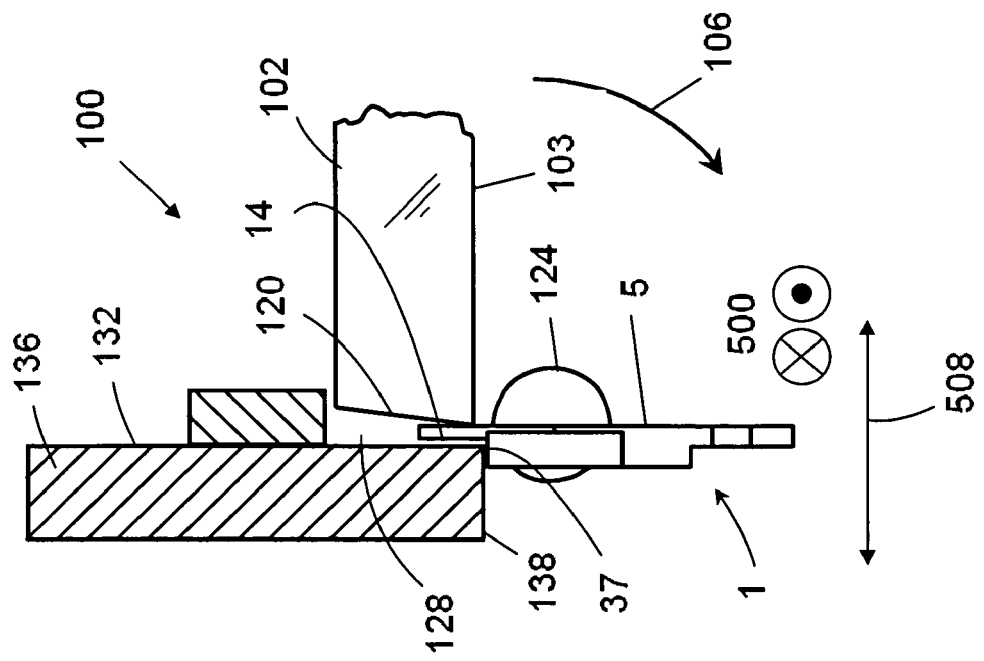
FIG. 21C shows a top view of one embodiment of the invention being used to check the maximum clearance on the hinge side of a single door unit or double door unit.

In one method, as shown in FIGS. 20 and 21A, 21B, and 21C, door gap gauge 1 is being used to check hinge side gap 128 clearance for single door unit 100 made from wood, metal, or other materials. In this method, door gap gauge 1 is used to first check the minimum requirement by utilizing measuring surface ¹⁄₁₆" 10, as shown in FIGS. 20, 21A and 21B, which represents a right hand door configuration. First, door gap gauge 1 is inserted such that first reference base 5 faces a hinge jamb edge 132, measuring surface ¹⁄₁₆" 10 faces a door hinge side edge 120, and a contact surface for ¹⁄₁₆" 33 engages single door face 103 (although engagement is not necessary for device to function correctly). If door gap gauge 1 cannot be inserted in this manner, hinge side gap 128 clearance fails since the hinge side gap 128 is less than ¹⁄₁₆-inch wide. If door gap gauge 1 can be inserted in this manner, at any location along hinge side gap 128, the examination of the minimum hinge side gap 128 clearance continues. Once inserted, lateral pressure is applied such that first reference base 5 is substantially engaged with hinge jamb edge 132 (alternately, lateral pressure could be applied such that measuring surface ¹⁄₁₆" 10 is substantially engaged with door hinge side edge 120). While maintaining lateral pressure, door gap gauge 1 is then moved in first measuring direction 500, which is either in the up direction or the down direction for hinge side gap 128 clearance. If, while moving door gap gauge 1 in first measuring direction 500, hinge side gap 128 clearance is less than ¹⁄₁₆-inch, door gap gauge 1 movement will stop, indicating a hinge side gap 128 clearance failure. Door gap gauge 1 is removed from hinge side gap 128 at this location and reinserted into hinge side gap 128 (as described above) just past the failed narrow area, and the procedure continues for the minimum clearance check in order to further define any other failure areas, if they exist. If, while moving door gap gauge 1 in first measuring direction 500, hinge side gap 128 clearance is greater than ¹⁄₁₆-inch, door gap gauge 1 movement will not stop, indicating hinge side gap 128 clearance is adequate for the minimum clearance specification.

Once the minimum hinge side gap 128 clearance is checked, door gap gauge 1 is then used to check the maximum requirement for hinge side gap 128 by utilizing measuring surface ⅛" 14. As seen in FIG. 21C, door gap gauge 1 is simply rotated by 90-degrees in a counterclockwise direction about z-axis 9, and then is inserted such that first reference base 5 faces hinge jamb edge 132, measuring surface ⅛" 14 faces door hinge side edge 120, and contact surface for ⅛" 37 engages single door face 103 (although engagement is not necessary for device to function correctly). Once inserted, reference base 5 should engage hinge jamb edge 132 and measuring surface ⅛" 14 should engage door hinge side edge 120, such that door gap gauge 1 cannot move significantly in a lateral direction 508, while still allowing door gap gauge 1 to move in first measuring direction 500 (shown as going in and out of the drawing in FIG. 21C). Once inserted, lateral pressure is applied such that first reference base 5 is substantially engaged with hinge jamb edge 132 (alternately, lateral pressure could be applied such that measuring surface ⅛" 14 is substantially engaged with door hinge side edge 120). Door gap gauge 1 is then moved in first measuring direction 500, which is either in the up direction or the down direction for hinge side gap 128 clearance. If, while moving door gap gauge 1 in first measuring direction 500, hinge side gap 128 clearance is less than ⅛-inch, door gap gauge 1 movement will stop. At this location, hinge side gap 128 clearance is sufficient if the minimum clearance check for this area has already passed. Door gap gauge 1 is removed from hinge side gap 128 at this location and reinserted into hinge side gap 128 (as discussed above) just past the narrow area, and the procedure continues for the maximum clearance check. If, while moving door gap gauge 1 in first measuring direction 500, hinge side gap 128 clearance is greater than ⅛-inch, measuring surface ⅛" 14 will disengage from door hinge side edge 120, (or reference base 5 will disengage from hinge jamb edge 132, depending on the direction of applied lateral pressure as discussed above), that is, door gap gauge 1 is allowed to move in a lateral direction 508, indicating a hinge side gap 128 clearance failure. The hinge side gap 128 maximum clearance check may continue at other areas along the hinge side gap 128 in order to further define any other failure areas, if they exist.

In another method for checking hinge side gap 128 clearance, the maximum clearance requirement may be checked first as described above, followed by checking the minimum requirement as described above, that is, the methodology discussed above is performed in reverse order (where door gap gauge 1 is rotated 90-degrees in a clockwise direction about a z-axis 9 when changing from the maximum check to the minimum check).

Figure 21D:
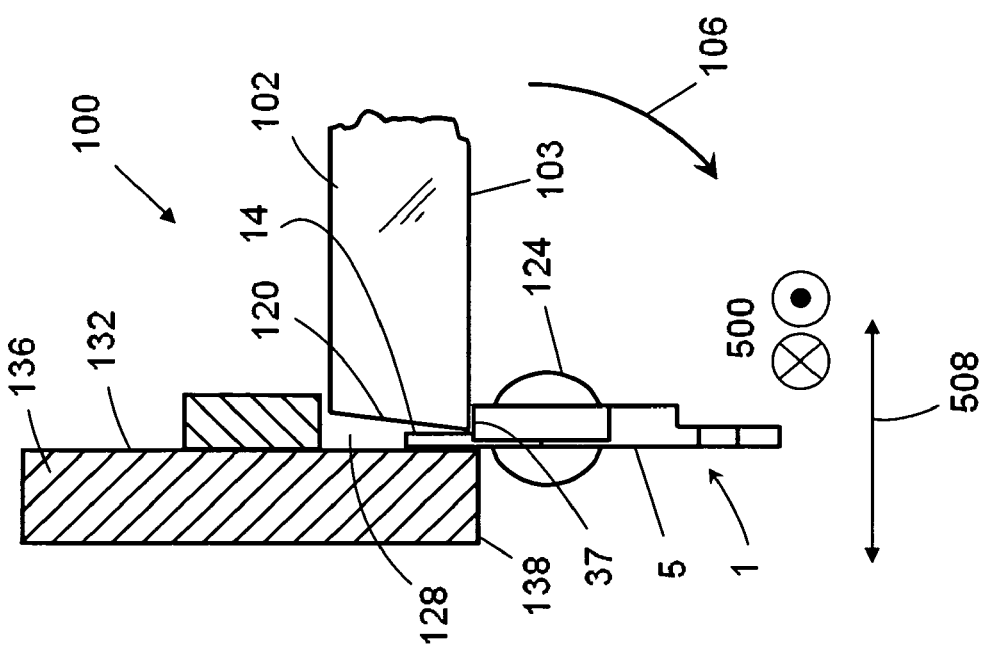
FIG. 21D shows a top view of one embodiment of the invention being used in an alternate position (rotated 180-degrees) to check the maximum clearance on the hinge side of a single door unit or double door unit.

Either method discussed above for checking hinge side gap 128 clearance may be implemented in an alternate method by rotating door gap gauge 1 by 180-degrees about y-axis 7, in either a clockwise or counterclockwise direction, and inserting door gap gauge 1 into hinge side gap 128. FIG. 21D is a top view of a right hand door configuration describing the rotated door gap gauge 1 when used in the maximum clearance. As the rotated door gap gauge 1 is inserted, first reference base 5 faces door hinge side edge 120, measuring surface ⅛" 14 faces hinge jamb edge 132, and contact surface for ⅛" 37 engages a hinge jamb face 138 (although engagement is not necessary for device to function correctly). The methods described above for the maximum clearance are then repeated to verify adequate clearance. For the minimum clearance check, door gap gauge 1 is simply rotated by 90-degrees in a clockwise direction about z-axis 9, and then is inserted such that first reference base 5 faces door hinge side edge 120, measuring surface ¹⁄₁₆" 10 faces hinge jamb edge 132, and contact surface for ¹⁄₁₆" 33 engages hinge jamb face 138 (although engagement is not necessary for device to function correctly). The methods described above for the minimum clearance are then repeated to verify adequate clearance.

Hinge side gap 128 clearances for the double door unit 200 are checked identically as described above for single door unit 100, where single door 102 components are replaced by an active door 216 components and an inactive door 204 components, respectively, where applicable.

Measuring hinge side gap 128 clearance when other door hardware may be present, such as weather seals, intumescent seals, etc., for either the single door unit 100 or the double door unit 200, is performed in a similar manner as described above in CHECKING GAPS IN VICINITY OF DOOR HARDWARE, where references to door strike side and strike jamb are replaced by references to door hinge side and hinge jamb, respectively, where applicable.

FIG. 22A, 22B, 22C, 22D and 22E

Checking the Top Gap

Figure 22A:
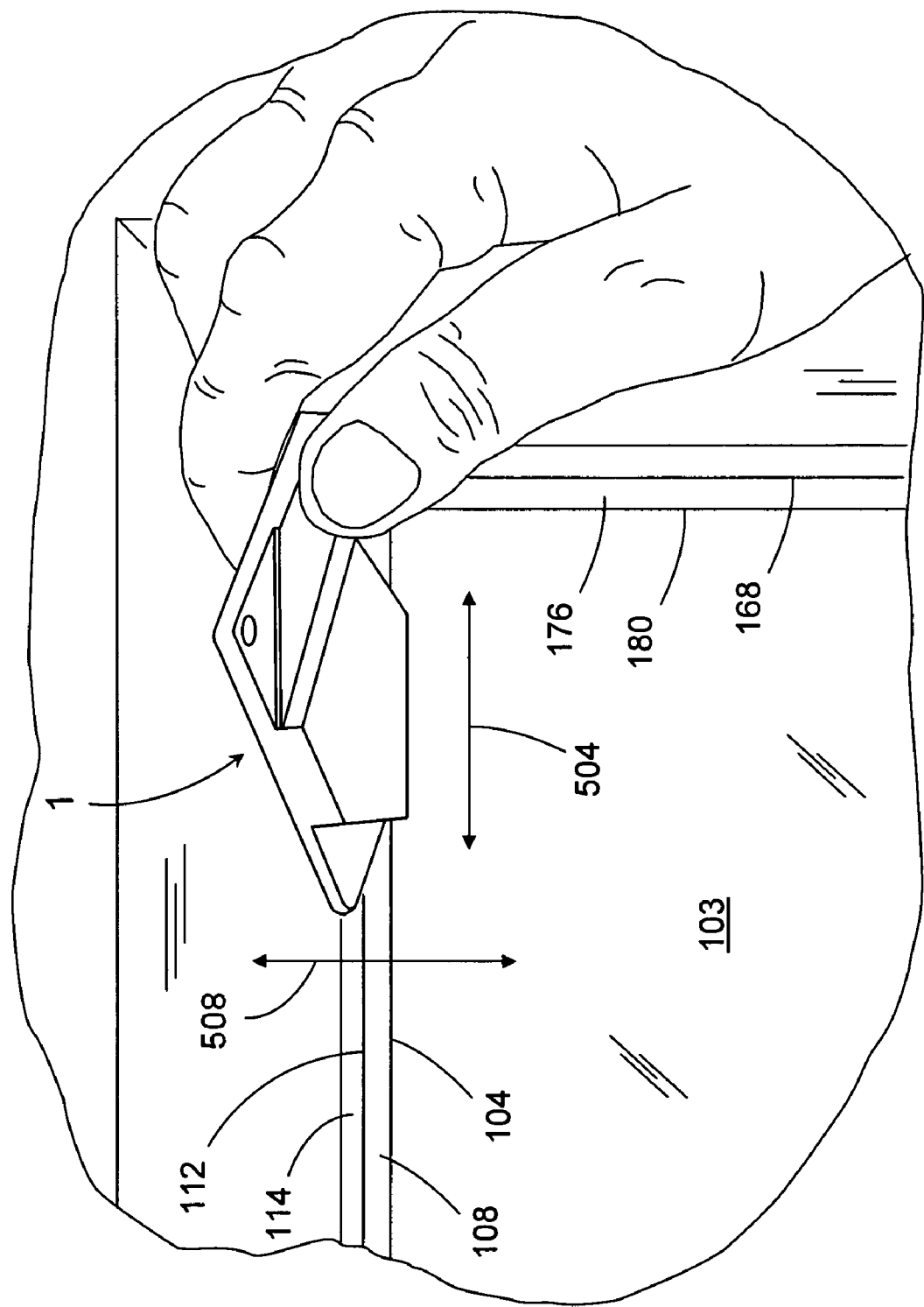
FIG. 22A shows a perspective view of one embodiment of the invention being used on the top side of a single or double door unit, configured for either left hand or right hand operation.
Figure 22B:
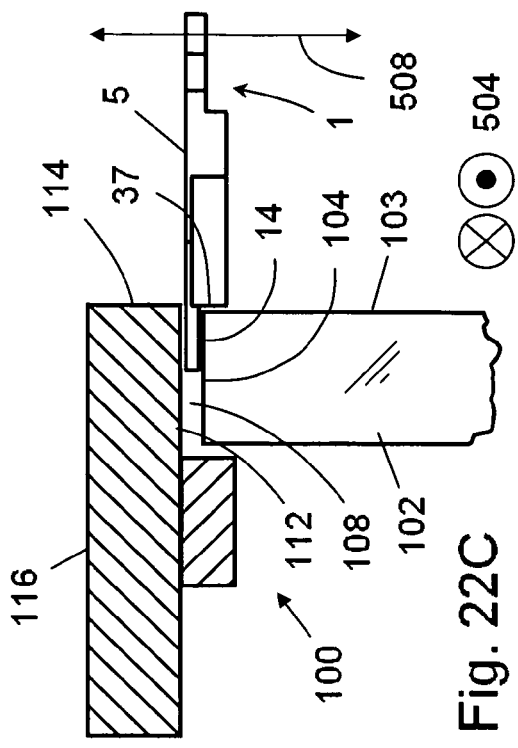
FIG. 22B shows a cross-sectional view of one embodiment of the invention being used as in FIG. 22A to check the minimum clearance of the top gap.

In one method, as shown in FIGS. 22A, 22B, 22C, 22D, and 22E, door gap gauge 1 is being used to check top gap 108 clearance for single door unit 100 made from wood, metal, or other materials. Door gap gauge 1 is used to first check the minimum clearance requirement by utilizing measuring surface ¹⁄₁₆" 10, as shown in FIGS. 22A and 22B. First, door gap gauge 1 is inserted such that first reference base 5 faces a head jamb edge 112, measuring surface ¹⁄₁₆" 10 faces a door top edge 104, and contact surface for ¹⁄₁₆" 33 engages single door face 103 (although engagement is not necessary for device to function correctly). If door gap gauge 1 cannot be inserted in this manner, top gap 108 clearance fails since the top gap 108 is less than ¹⁄₁₆-inch wide. If door gap gauge 1 can be inserted in this manner, at any location along top gap 108, the examination of the minimum top gap 108 clearance continues. Once inserted, lateral pressure is applied such that first reference base 5 is substantially engaged with head jamb edge 112 (alternately, lateral pressure could be applied such that measuring surface ¹⁄₁₆" 10 is substantially engaged with door top edge 104). While maintaining lateral pressure, door gap gauge 1 is then moved in a second measuring direction 504, which is either in the right or left direction for top gap 108 clearance (shown as going in and out of the drawing in FIG. 22B). If, while moving door gap gauge 1 in second measuring direction 504, top gap 108 clearance is less than ¹⁄₁₆-inch, door gap gauge 1 movement will stop, indicating a top gap 108 clearance failure. Door gap gauge 1 is removed from top gap 108 at this location and reinserted into top gap 108 (as described above) just past the failed narrow area, and the procedure continues for the minimum clearance check in order to further define any other failure areas, if they exist. If, while moving door gap gauge 1 in second measuring direction 504, top gap 108 clearance is greater than ¹⁄₁₆-inch, door gap gauge 1 movement will not stop, indicating top gap 108 clearance is adequate for the minimum clearance specification.

Figure 22C:
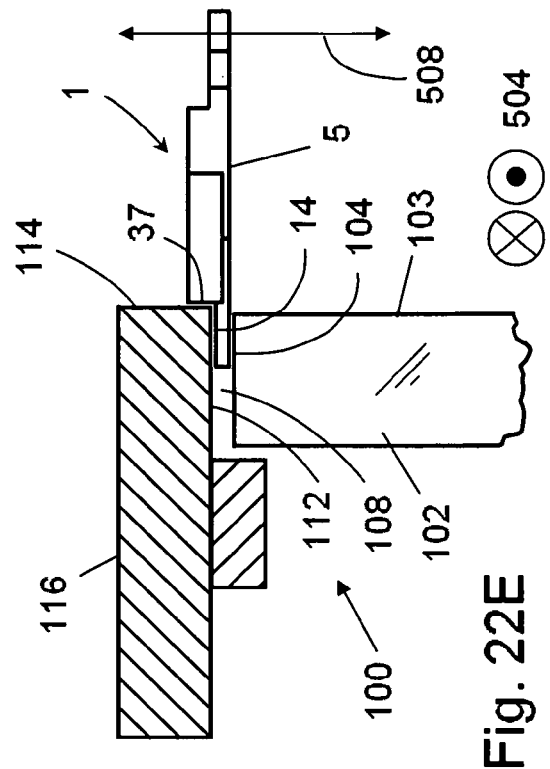
FIG. 22C shows a cross-sectional view of one embodiment of the invention being used as in FIG. 22A to check the maximum clearance of the top gap

Once the minimum top gap 108 clearance is checked, door gap gauge 1 is then used to check the maximum clearance requirement for top gap 108 by utilizing measuring surface ⅛" 14. As seen in FIG. 22C, door gap gauge 1 is simply rotated by 90-degrees in a counterclockwise direction about z-axis 9, and then is inserted such that first reference base 5 faces head jamb edge 112, measuring surface ⅛" 14 faces door top edge 104, and a contact surface for ⅛" 37 engages single door face 103 (although engagement is not necessary for device to function correctly). Once inserted, reference base 5 should engage head jamb edge 112 and measuring surface ⅛" 14 should engage door top edge 104, such that door gap gauge 1 cannot move significantly in a lateral direction 508, while still allowing door gap gauge 1 to move in second measuring direction 504. Once inserted, lateral pressure is applied such that first reference base 5 is substantially engaged with head jamb edge 112 (alternately, lateral pressure could be applied such that measuring surface ⅛" 14 is substantially engaged with door top edge 104). Door gap gauge 1 is then moved in second measuring direction 504, which is either in the right or left direction for top gap 108 clearance. If, while moving door gap gauge 1 in second measuring direction 504, top gap 108 clearance is less than ⅛-inch, door gap gauge 1 movement will stop. At this location, top gap 108 clearance is sufficient if the minimum clearance check for this area has already passed. Door gap gauge 1 is removed from top gap 108 at this location and reinserted into top gap 108 (as discussed above) just past the narrow area, and the procedure continues for the maximum clearance check. If, while moving door gap gauge 1 in second measuring direction 504, top gap 108 clearance is greater than ⅛-inch, measuring surface ⅛" 14 will disengage from door top edge 104, (or reference base 5 will disengage from head jamb edge 112, depending on the direction of applied lateral pressure as discussed above), that is, door gap gauge 1 is allowed to move in a lateral direction 508, indicating a top gap 108 clearance failure. The top gap 108 maximum clearance check may continue at other areas along the top gap 108 in order to further define any other failure areas, if they exist.

In another method for checking top gap 108 clearance, the maximum requirement may be checked first as described above, followed by checking the minimum requirement as described above, that is, the methodology discussed above is performed in reverse order (where door gap gauge 1 is rotated 90-degrees in a clockwise direction about a z-axis 9 when changing from the maximum check to the minimum check).

Figure 22D:
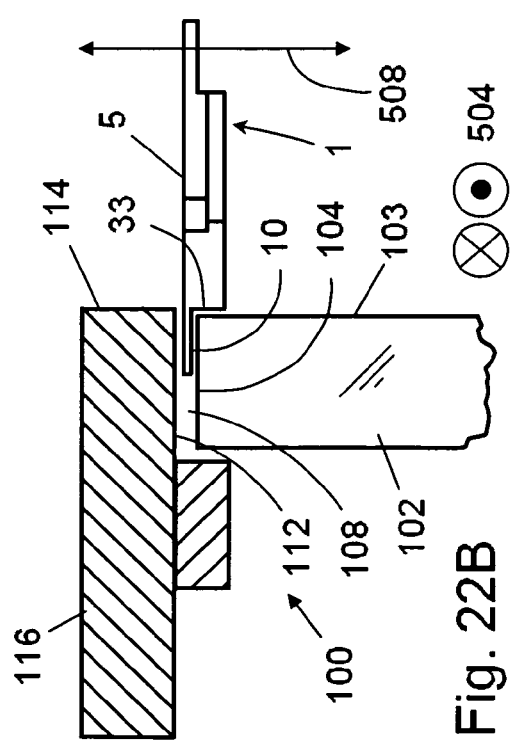
FIG. 22D shows a cross-sectional view of one embodiment of the invention being used in an alternate position (rotated 180-degrees) to check the minimum clearance of the top gap.
Figure 22E:
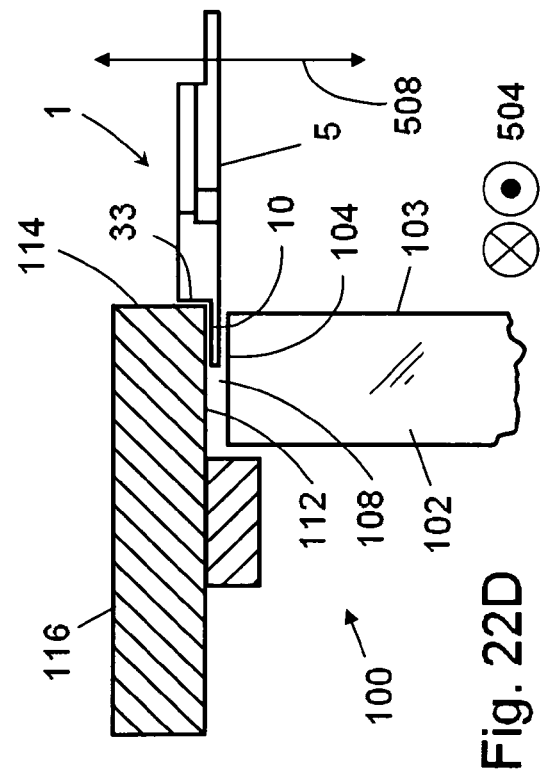
FIG. 22E shows a cross-sectional view of one embodiment of the invention being used in an alternate position (rotated 180-degrees) to check the maximum clearance of the top gap.

Either method discussed above for checking top gap 108 clearance may be implemented in an alternate method by rotating door gap gauge 1 by 180-degrees about y-axis 7, in either a clockwise or counterclockwise direction, and inserting door gap gauge 1 into top gap 108. FIG. 22D describes the rotated door gap gauge 1 when used in the minimum clearance check. As the rotated door gap 1 is inserted, first reference base 5 faces door top edge 104, measuring surface ¹⁄₁₆" 10 faces head jamb edge 112, and a contact surface for ¹⁄₁₆" 33 engages head jamb face 114 (although engagement is not necessary for device to function correctly). The methods described above for the minimum clearance check are then repeated to verify adequate clearance. For the maximum clearance check, as shown in FIG. 22E, door gap gauge 1 is simply rotated by 90-degrees in a counterclockwise direction about z-axis 9, and then is inserted such that first reference base 5 faces door top edge 104, measuring surface ⅛" 14 faces head jamb edge 112, and a contact surface for ⅛" 37 engages head jamb face 114 (although engagement is not necessary for device to function correctly). The methods described above for the maximum clearance are then repeated to verify adequate clearance.

Top gap 108 clearances for the double door unit 200 are checked in a similar manner as described above for single door unit 100, where single door 102 is replaced by active door 216 and inactive door 204, respectively, where applicable.

Measuring top gap 108 clearance when other door hardware may be present, such as flush bolts, weather seals, intumescent seals, etc., for either the single door unit 100 or the double door unit 200, is performed in a similar manner as described above in CHECKING GAPS IN VICINITY OF DOOR HARDWARE, where references to door strike side and strike jamb are replaced by references to door top and head jamb, respectively, where applicable.

FIGS. 23, 24, 25, and 26

Checking the Bottom Gap

Figure 23:
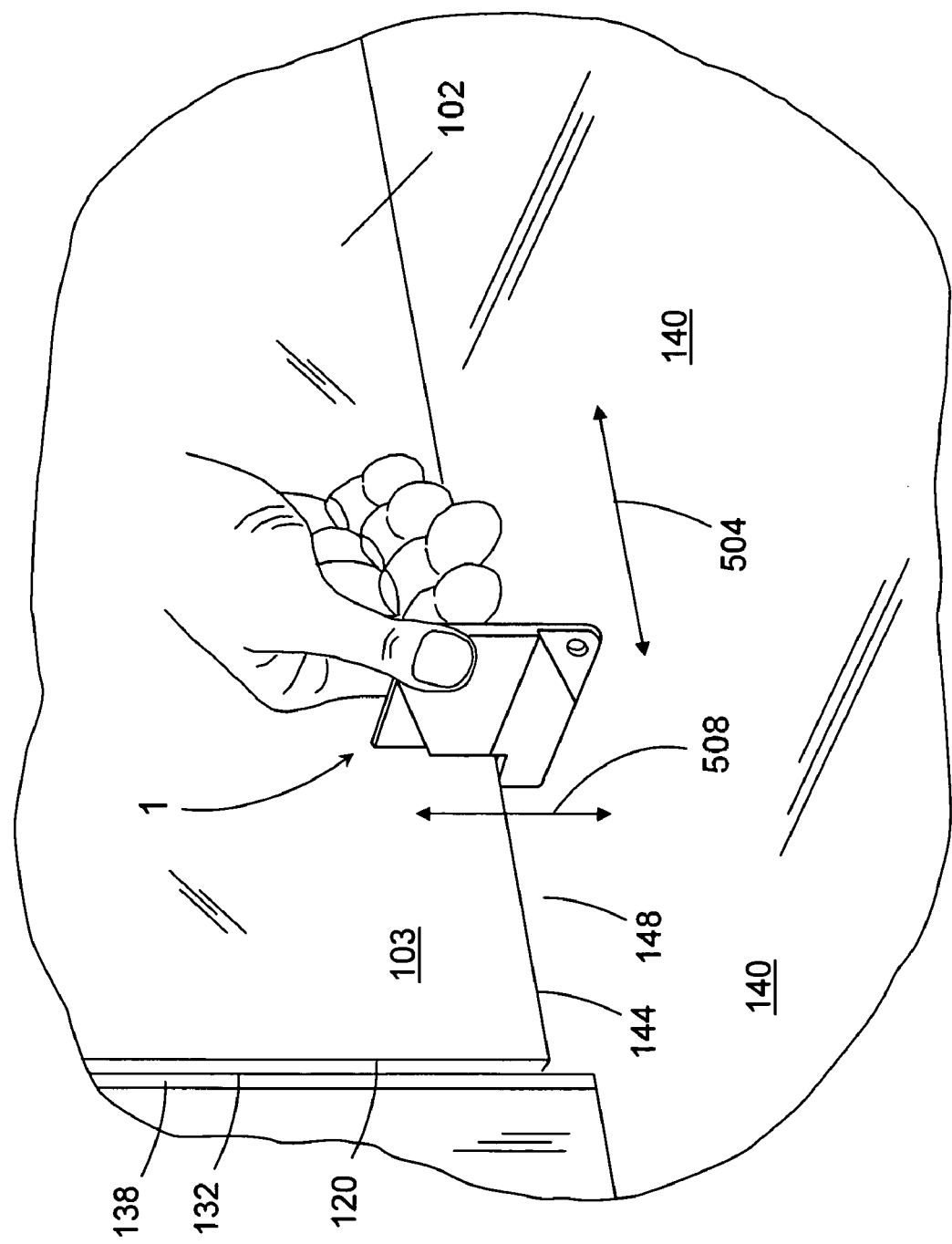
FIG. 23 shows a perspective view of one embodiment of the invention being used on the bottom side of a single or double door unit when the floor is noncombustible.
Figure 24:
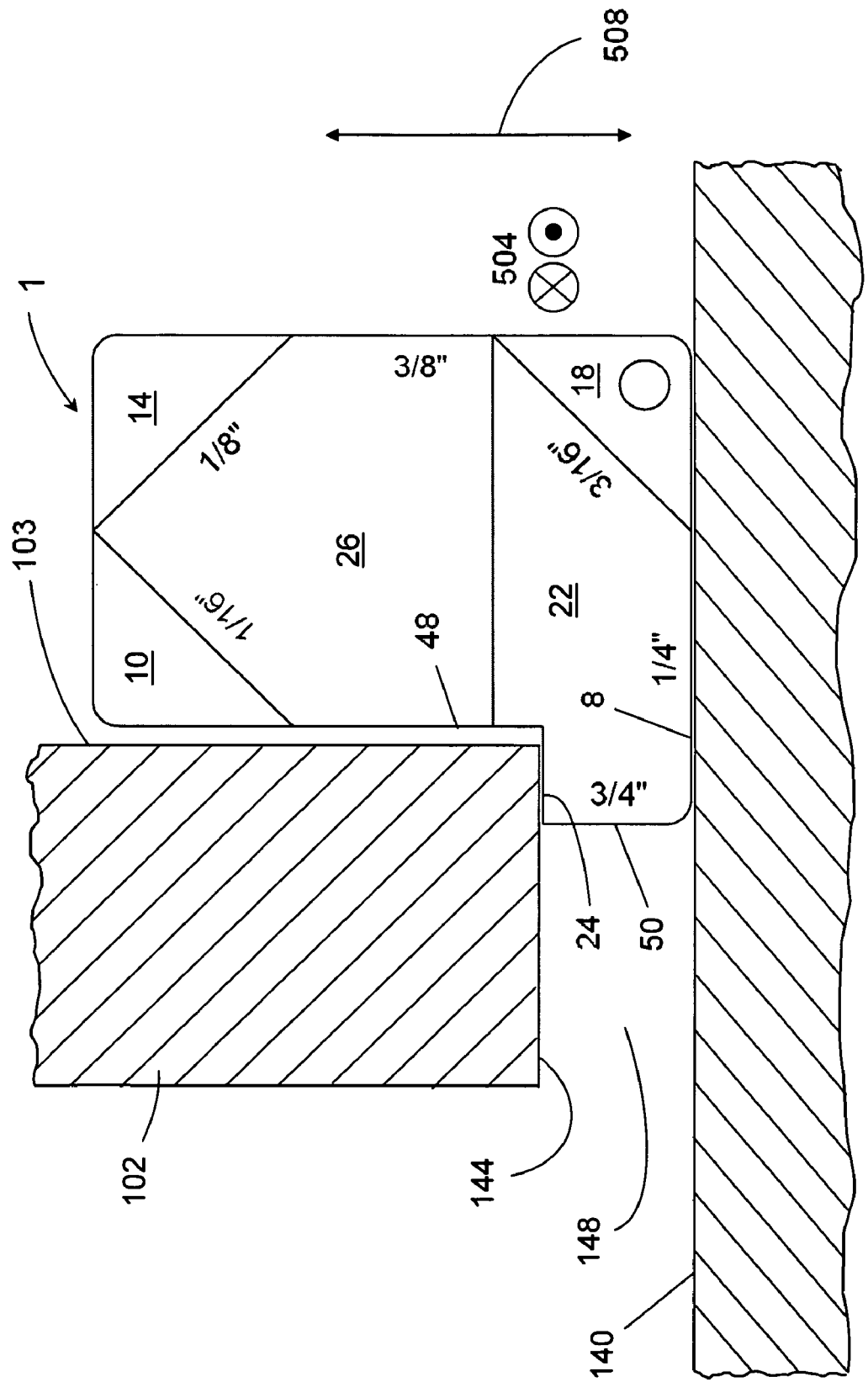
FIG. 24 shows a side cross-sectional view of one embodiment of the invention being used in FIG. 23 on the bottom side of a single or double door unit.

In one method, as shown in FIGS. 23 and 24, door gap gauge 1 is being used to check bottom gap 148 clearance for single door unit 100 and double door unit 200 when noncombustible floor surface 140 is present. The following description uses the single door unit 100 to describe the procedure, however, bottom gap 148 clearances for the double door unit 200 are checked in a similar manner, where single door 102 components are replaced by active door 216 components and inactive door 204 components, respectively, where applicable.

Door gap gauge 1 is used to check the clearance requirement by utilizing measuring surface for ¾" 24. Door gap gauge 1 is inserted such that second reference base 8 faces noncombustible floor surface 140, measuring surface for ¾" 24 faces a door bottom edge 144, and connecting surface two for ⅜" 48 engages single door face 103 (although engagement is not necessary for device to function correctly). If door gap gauge 1 cannot be inserted in this manner, bottom gap 148 clearance passes, since bottom gap 148 is less than ¾-inch wide. Once inserted, second reference base 8 should engage noncombustible floor surface 140 and measuring surface for ¾" 24 should engage door bottom edge 144, such that door gap gauge 1 cannot move significantly in lateral direction 508, while still allowing door gap gauge 1 to move in second measuring direction 504 (shown as going in and out of the drawing in FIG. 24). Once inserted, lateral pressure is then applied such that second reference base 8 is substantially engaged with noncombustible floor surface 140 (alternately, lateral pressure could be applied such that measuring surface for ¾" 24 is substantially engaged with door bottom edge 144). Door gap gauge 1 is then moved in second measuring direction 504, which is either in the right or left direction for bottom gap 148 clearance. If, while moving door gap gauge 1 in second measuring direction 504, bottom gap 148 clearance is less than ¾-inch, door gap gauge 1 movement will stop. At this location, bottom gap 148 clearance is sufficient and bottom gap 148 clearance passes. Door gap gauge 1 is removed from bottom gap 148 at this location and reinserted into bottom gap 148 (as described above) just past the narrow area, and the procedure continues for the bottom gap 148 clearance check. If, while moving door gap gauge 1 in second measuring direction 504, bottom gap 148 clearance is greater than ¾-inch, measuring surface for ¾" 24 will disengage from door bottom edge 144, (or second reference base 8 will disengage from noncombustible floor surface 140, depending on the direction of applied lateral pressure), that is, door gap gauge 1 is allowed to move in a lateral direction 508, indicating a bottom gap 148 clearance failure. The bottom gap 148 clearance check may continue at other areas along the bottom gap 148 in order to further define any other failure areas, if they exist.

Figure 25:
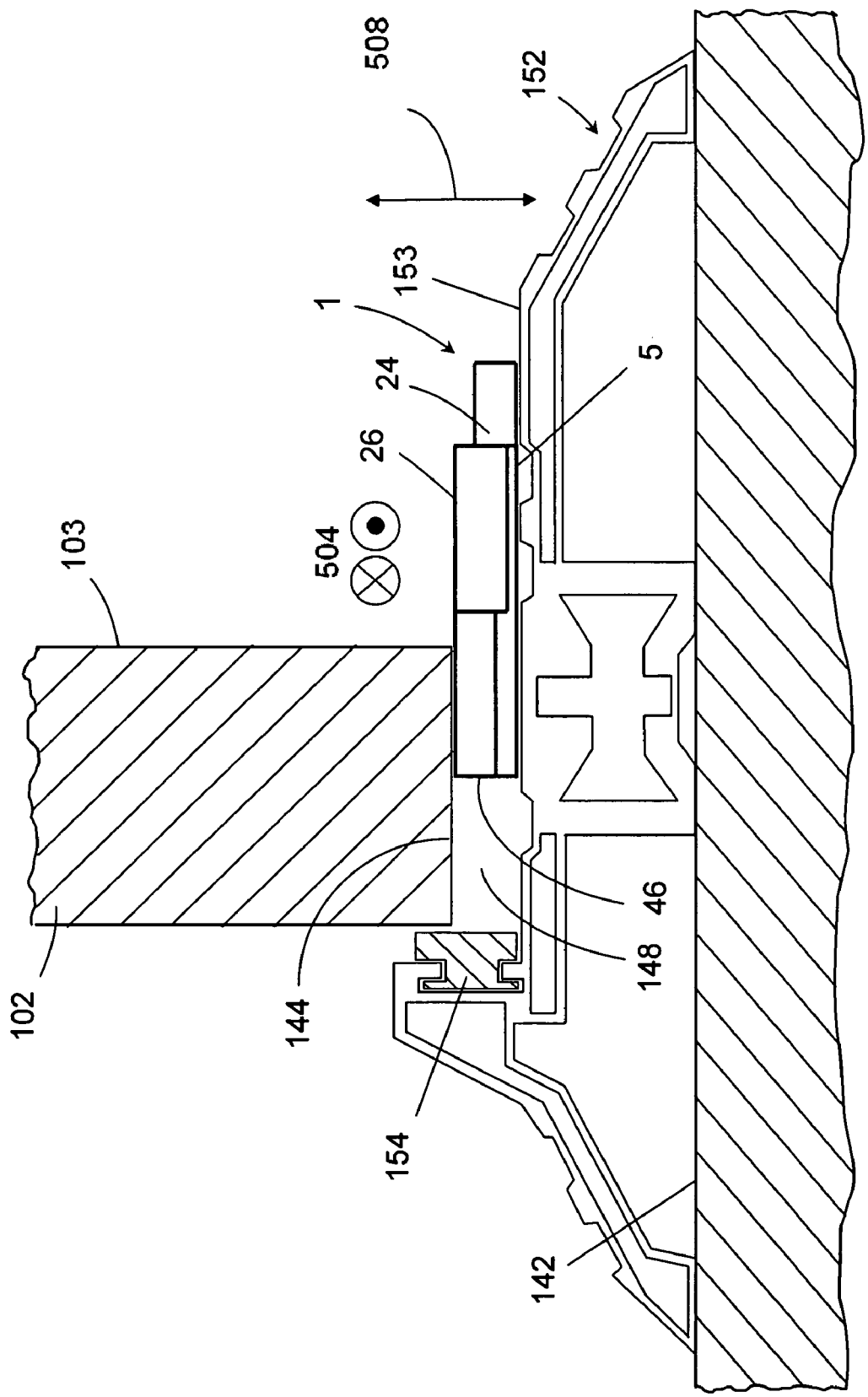
FIG. 25 shows a side cross-sectional view of one embodiment of the invention being used on the bottom side of a single door unit when a combustible floor is present and threshold-sill unit has been installed.

In another method, as shown in FIG. 25, door gap gauge 1 is being used to check bottom gap 148 clearance for single door unit 100 and double door unit 200, when combustible floor surface 142 is present and threshold-sill unit 152 is installed. The following description uses the single door unit 100 to describe the procedure, however, bottom gap 148 clearances for the double door unit 200 are checked in a similar manner, where single door 102 components are replaced by active door 216 components and inactive door 204 components, respectively, where applicable.

Door gap gauge 1 is used to check the clearance requirement by utilizing measuring surface for ⅜" 26. Door gap gauge 1 is inserted such that first reference base 5 faces a sill top surface 153, and measuring surface for ⅜" 26 faces door bottom edge 144. If door gap gauge 1 cannot be inserted in this manner, bottom gap 148 clearance passes, since bottom gap 148 is less than ⅜-inch wide with threshold-sill unit 152 installed. Once inserted, first reference base 5 should engage sill top surface 153 and measuring surface ⅜" 26 should engage door bottom edge 144, such that door gap gauge 1 cannot move significantly in lateral direction 508, while still allowing door gap gauge 1 to move in second measuring direction 504 (shown as going in and out of the drawing in FIG. 25). Once inserted, lateral pressure is applied such that first reference base 5 is substantially engaged with sill top surface 153 (alternately, lateral pressure could be applied such that measuring surface ⅜" 26 is substantially engaged with door bottom edge 144). Door gap gauge 1 is then moved in second measuring direction 504, which is either in the right or left direction for bottom gap 148 clearance. If, while moving door gap gauge 1 in second measuring direction 504, bottom gap 148 clearance is less than ⅜-inch, door gap gauge 1 movement will stop. At this location, bottom gap 148 clearance is sufficient and bottom gap 148 clearance passes. Door gap gauge 1 is removed from bottom gap 148 at this location and reinserted into bottom gap 148 (as discussed above) just past the narrow area, and the procedure continues for the bottom gap 148 clearance check. If, while moving door gap gauge 1 in second measuring direction 504, bottom gap 148 clearance is greater than ⅜-inch, measuring surface for ⅜" 26 will disengage from door bottom edge 144, (or first reference base 5 will disengage from sill top surface 153, depending on the direction of applied lateral pressure as discussed above), that is, door gap gauge 1 is allowed to move in a lateral direction 508, indicating a bottom gap 148 clearance failure. The bottom gap 148 clearance check may continue at other areas along the bottom gap 148 in order to further define any other failure areas, if they exist.

In the method discussed above for checking ⅜-inch clearance, bottom gap 148 clearance may be implemented in an alternate method by rotating door gap gauge 1 by 180-degrees about an x-axis 6, in either a clockwise or counterclockwise direction, and then inserting rotated door gap gauge 1 into bottom gap 148. As door gap 1 is inserted, first reference base 5 faces door bottom edge 144 and measuring surface for ⅜" 26 faces sill top surface 153. The method described above for checking ⅜-inch clearance is then repeated to verify adequate clearance for both single door unit 100 or double door unit 200.

Figure 26:
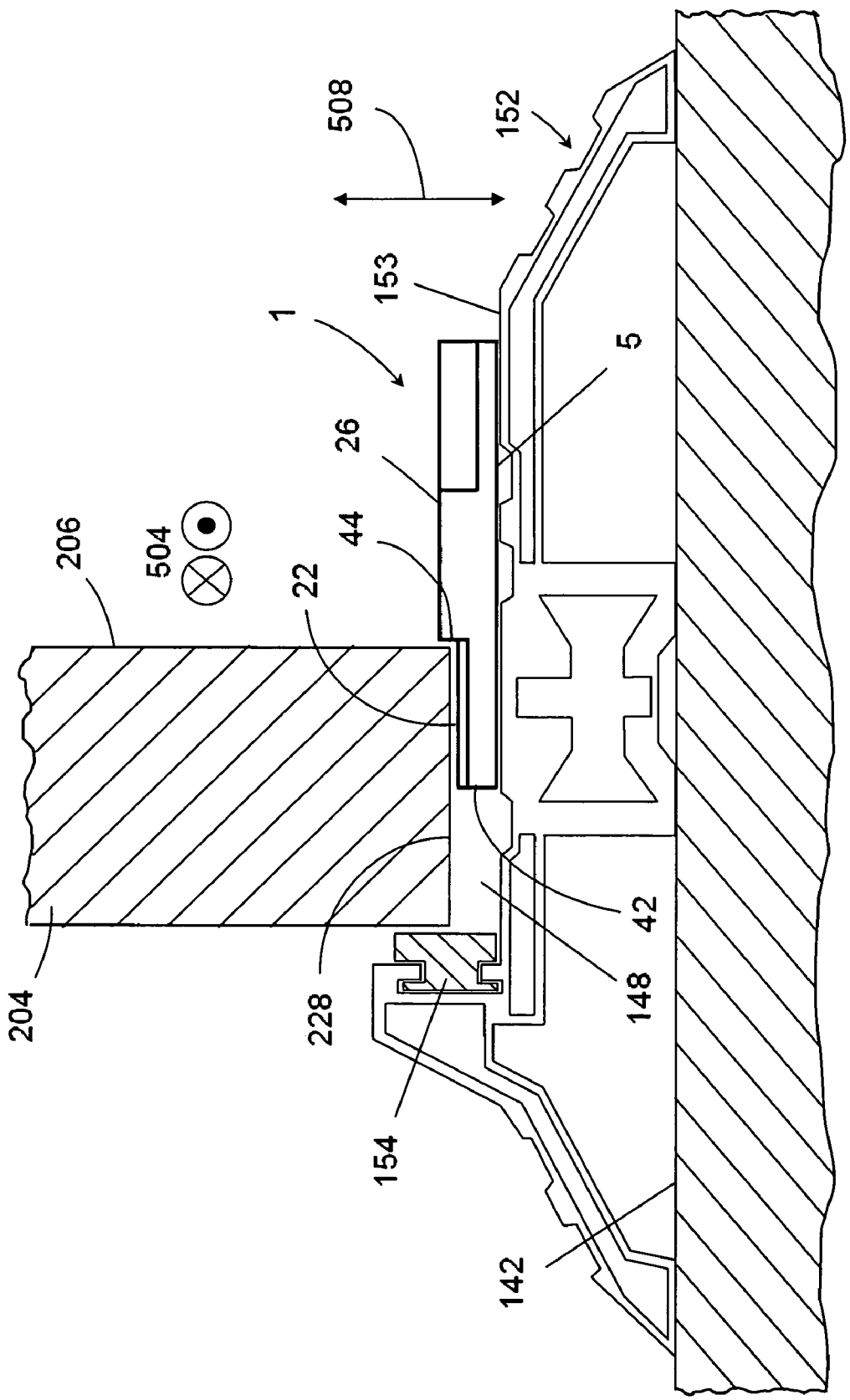
FIG. 26 shows a side cross-sectional view of one embodiment of the invention being used on the bottom side of a double door unit when a threshold-sill unit has been installed and "Americans with Disabilities Act" regulations are considered.

In yet another method, as shown in FIG. 26, door gap gauge 1 is being used to check bottom gap 148 clearance for single door unit 100 and double door unit 200, when combustible floor surface 142 is present, threshold-sill unit 152 is installed (considering a typical ½-inch high threshold-sill unit 152), and changes in level (height) must meet ADA regulations (note that a ¼-inch or ⅜-inch high threshold-sill unit 152 would pass ADA standards at which point door gap gauge 1 is used to check bottom gap 148 clearance requirement by utilizing measuring surface for ⅜" 26 as discussed above). The following description uses inactive door 204 components to describe the procedure, however, bottom gap 148 clearances for active door 216, and single door unit 100, are checked in a similar manner, where inactive door 204 components are replaced by active door 216 components, and single door 100 components, respectively, where applicable.

Door gap gauge 1 is used to check the clearance requirement by utilizing measuring surface for ¼" 22. Door gap gauge 1 is inserted such that first reference base 5 faces sill top surface 153, and measuring surface for ¼" 22 faces an inactive door bottom edge 228. If door gap gauge 1 cannot be inserted in this manner, bottom gap 148 clearance passes, since bottom gap 148 is less than ¼-inch wide (indicating that overall bottom gap 148 is ¾-inch or less). If door gap gauge 1 can be inserted in this manner, at any location along bottom gap 148, the examination of the bottom gap 148 clearance continues.

Once inserted, first reference base 5 should engage sill top surface 153 and measuring surface ¼" 22 should engage inactive door bottom edge 228, such that door gap gauge 1 cannot move significantly in a lateral direction 508, while still allowing door gap gauge 1 to move in second measuring direction 504 (shown as going in and out of the drawing in FIG. 26). Once inserted, lateral pressure is applied such that first reference base 5 is substantially engaged with sill top surface 153 (alternately, lateral pressure could be applied such that measuring surface ¼" 22 is substantially engaged with inactive door bottom edge 228). Door gap gauge 1 is then moved in second measuring direction 504, which is either in the right or left direction for bottom gap 148 clearance. If, while moving door gap gauge 1 in second measuring direction 504, bottom gap 148 clearance is less than ¼-inch, door gap gauge 1 movement will stop. At this location, bottom gap 148 clearance is sufficient. Door gap gauge 1 is removed from bottom gap 148 at this location and reinserted into bottom gap 148 just past the narrow area (as discussed just above), and the procedure continues. If, while moving door gap gauge 1 in second measuring direction 504, bottom gap 148 clearance is greater than ¼-inch, measuring surface ¼" 22 will disengage from inactive door bottom edge 228, (or reference base 5 will disengage from sill top surface 153, depending on the direction of applied lateral pressure as discussed above), that is, door gap gauge 1 is allowed to move in a lateral direction 508, indicating a bottom gap 148 clearance failure. The bottom gap 148 clearance check may continue at other areas along the bottom gap 148 in order to further define any other failure areas, if they exist.

In the method discussed above for checking ¼-inch clearance, bottom gap 148 clearance may be implemented in an additional method by rotating door gap gauge 1 by 180-degrees about y-axis 7, in either a clockwise or counterclockwise direction, and then inserting door gap gauge 1 into bottom gap 148. As door gap 1 is inserted, first reference base 5 faces door bottom edge 144 and measuring surface for ¼" 22 faces sill top surface 153. The method described above for checking ¼-inch clearance is then repeated to verify adequate clearance.

FIG. 27

Checking the Bottom Gap in Vicinity of Door Hardware

Figure 27:
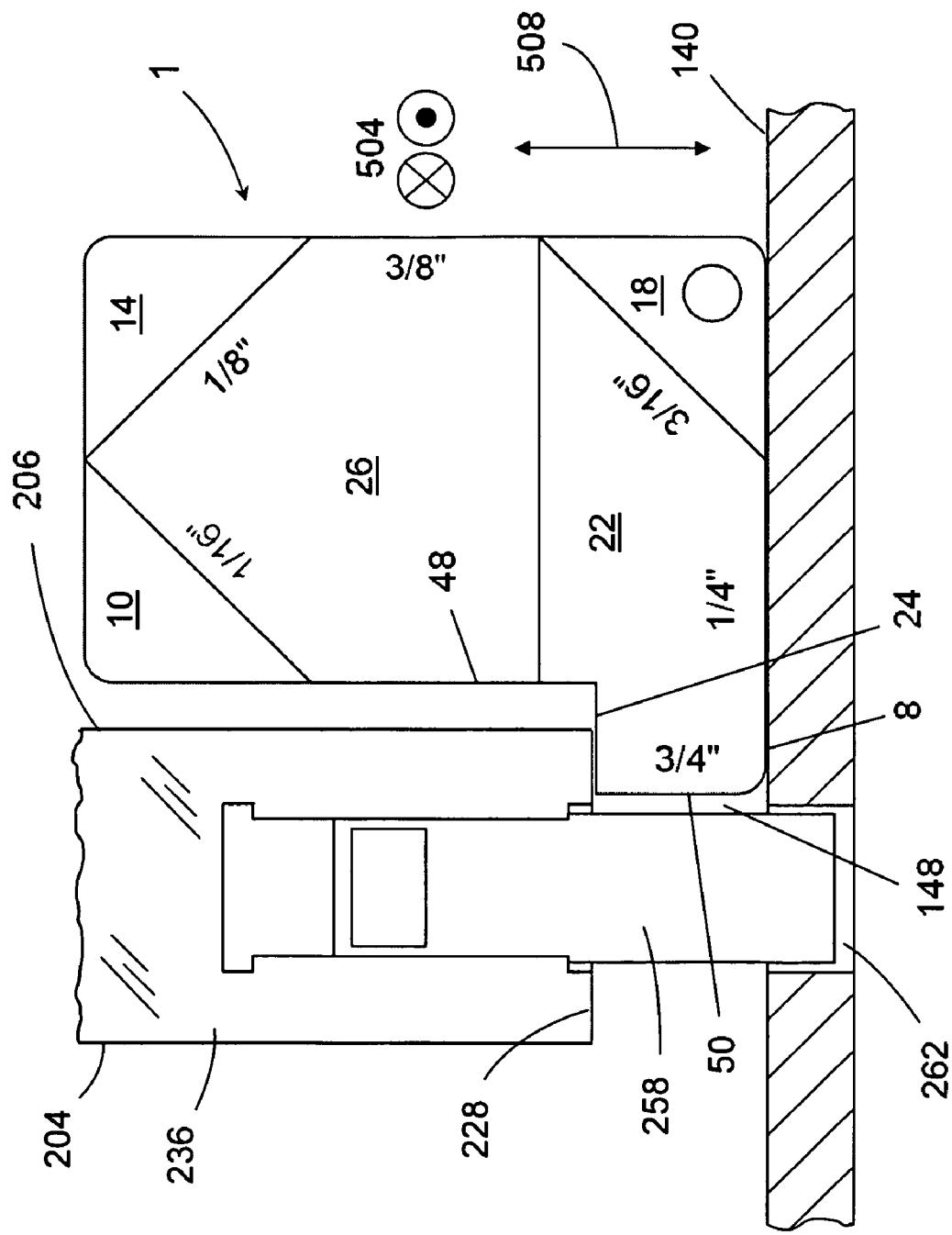
FIG. 27 shows a side cross-sectional view of one embodiment of the invention being used on the bottom side of a single or double door unit where a flush bolt is being used when the floor is noncombustible.

FIG. 27 shows a side view of an application when the door gap gauge 1 is used to check bottom gap 148 clearance near door hardware, which may include flush bolts, weather stripping, bottom brushes, or automatic door bottoms, to name a few. In this particular example a flush bolt 258, which may be used to secure inactive door 204 in a double door unit 200, is shown. For this example, door gap gauge 1 is used to check for a ¾-inch clearance since noncombustible floor surface 140 is present. When door gap gauge 1 is inserted, second reference base 8 engages noncombustible floor surface 140 and measuring surface for ¾" 24 engages inactive door bottom edge 228, such that door gap gauge 1 cannot move significantly in lateral direction 508, while still allowing door gap gauge 1 to move in second measuring direction 504 (shown as going in and out of the drawing in FIG. 27), as discussed above for bottom gap clearance. Door gap gauge 1 is being moved from the right to the left along inactive door 204 in second measuring direction 504 (although door gap gauge 1 could be moved in the other direction, from left to right, as well). In this alternate method, as door gap gauge 1 approaches flush bolt 258, surface 22 may engage flush bolt 258. At this location, door gap gauge 1 is pulled outward, perpendicular to inactive door face 206, until surface 22 just disengages from flush bolt 258 (as shown in FIG. 27). Second reference base 8 and measuring surface ¾" 24 are still positioned within bottom gap 148, and the clearance check continues past flush bolt 258, as discussed above for bottom gap clearance. Once door gap gauge 1 has moved past flush bolt 258, door gap gauge 1 may be inserted fully in bottom gap 148 until surface 48 engages inactive door face 206. The clearance check procedure then continues as before, as discussed above for bottom gap clearance.

In yet another method door gap gauge 1 may be initially positioned such that surface 22 never engages flush bolt 258 as door gap gauge 1 is moved along second measuring direction 504 along the entire length of inactive door 204 within bottom gap 148, as described in FIG. 27. That is, door gap gauge 1 is not fully inserted in bottom gap 148, but second reference base 8 and measuring surface ¾" 24 are still positioned within bottom gap 148, allowing for clearance checking, as discussed above for bottom gap clearance.

The above procedures also apply to bottom gap 148 clearance for active door 216, and single door unit 100, when other door hardware, such as weather stripping, bottom brushes, or automatic door bottoms, to name a few, may be present.

Additionally, the above procedures, pertaining to other door hardware, apply to situations when combustible floor surface 142 is present and threshold-sill unit 152 is installed. That is, door gap gauge 1 is capable of checking bottom gap measurement in a variety of situations.

FIGS. 8, 9A and 9B

Checking Gaps Using Tactile Locator Markers

In yet another method, door gap gauge 300, with plurality of tactile locator marker groups 302, 304, 308, 312, 316, and 320, is used for quick and accurate determination of building code compliance for all gap openings related to door installations. In this method, the door gap gauge user may position door gap gauge 1 to the desired gap clearance measurement orientation by utilizing the finger's sense of touch to feel the shape and number of tactile locator marker groups 302, 304, 308, 312, 316, and 320, which in turn indicate which measuring surface is being used. Each tactile locator marker group includes a tactile directional marker 324 and a subgroup of gap measurement marker indicators 330, 334, 338, 342, 346, and 350, indicating measurements 1/16", 1/8", 3/16", 1/4", 3/8", and 3/4", respectively.

As an example, shown in FIG. 8, in order to check the 1/8-inch clearance, door gap gauge user would hold door gap gauge 1 such that the user's thumb would align in a tactile directional locator direction 326 over tactile locator marker group for 1/8" 304. The user's thumb would physically sense tactile locator marker subgroup for 1/8" 330 and tactile directional locator 324, which is located just behind subgroup 330 along tactile directional locator direction 326. If the user does not sense tactile directional locator 324 just behind subgroup 330, door gap gauge 300 is not correctly oriented for the 1/8-inch gap clearance. Clearance checking for all 1/8" gaps is then performed identically to those methods presented above. This tactile method is repeated in a similar manner for all gap measurement surfaces.

From the foregoing, it is apparent that the door gap gauge described above not only provides for the reliable accomplishment of the purpose of the invention, but does so in a particularly simple, quick and reliable manner. It is recognized, of course, that those skilled in the art may make various modifications or additions to the exemplary embodiments chosen to illustrate the invention without departing from the spirit and scope of the present contribution to the art. Accordingly, it is to be understood that the protection sought and to be afforded hereby should be deemed to extend to the subject matter claimed and all equivalents thereof within the scope of the invention.

What is claimed is:

1. A device for measuring spatial dimensions of door gap openings, and for determining compliance with a plurality of building codes, which set forth the standards for such spatial dimensions, comprising:
   a block of material; and
   said block of material having a planar reference base and a plurality of planar measuring surfaces parallel to said reference base at different distances from said reference base;
   wherein at least one of said measuring surfaces extends beyond a projected area of said reference base.

2. The device of claim 1 wherein said planar measuring surfaces are joined to each other and to said reference base by a plurality of planar connecting surfaces.

3. The device of claim 1 wherein the distances between said reference base and six of said measuring surfaces produce a plurality of measurement widths 1/16", 1/8", 3/16", 1/4", 3/8", and 3/4", pertaining to said building codes.

4. The device of claim 3 wherein each one of said measurement widths is indicated by a representative visual indicia.

5. The device of claim 3 wherein each one of said measurement widths is indicated by a representative plurality of tactile markers.

6. The device of claim 1 wherein said measuring surfaces other than said at least one measuring surface are within a projected area of said reference base.

7. The device of claim 1 further comprising a second planar reference base normal to said original planar base, each said reference base having a plurality of planar measuring surfaces parallel to each said base.

8. The device of claim 7 wherein said planar measuring surfaces of both said original reference base and said second reference base are joined to their respective reference bases and to each other reference base by said planar connecting surfaces.

9. The device of claim 1 further comprising an aperture located on at least one of said plurality of measuring surfaces, said aperture extending through said measuring surface to said respective reference base.

10. The device of claim 1 further comprising an instructional label located on said reference base.

11. A method for measuring a gap opening between a door edge and a door frame component, and for determining compliance with a plurality of building codes, which set forth the standards for such gap opening measurements, comprising the steps of:
    (a) providing a device having at least one planar reference base and at least one planar measuring surface,
    (b) selecting said reference base and said measuring surface for corresponding said code,
    (c) inserting said device into said gap opening,
    (d) positioning said reference base adjacent said door frame component,
    (e) monitoring position of said planar measuring surface with respect to said door edge,
    (f) determining a gap opening measurement, and
    (g) comparing said gap opening measurement to said building code to determine door gap opening compliance,
    whereby said device is used to quickly and easily check compliance of gap openings related to door installations.

12. A method as recited in claim 11 further including the step of moving said device along the entire length of said door gap opening and comparing said gap spacing measurement along the entire length of said door gap opening to said building code to determine door gap opening compliance.

13. The method in claim 11 wherein the step for providing said device includes providing a device with a first planar reference base and a first plurality of planar measuring surfaces, each one of said plurality of measuring surfaces having a different predetermined width, measured from said first base to each one of said first plurality of measuring surfaces, each said predetermined width representative of at least one of said building codes.

14. The method in claim 11 wherein the step for providing said device includes providing a device with a second planar reference base and a second plurality of planar measuring surfaces, each one of said plurality of measuring surfaces having a different predetermined width, measured from said second base to each one of said second plurality of measuring surfaces, each said predetermined width representative of at least one of said building codes.

15. A method as recited in claim 11 alternately including the steps of positioning said reference base adjacent said door edge and monitoring position of said planar measuring surface with respect to said door frame component.

16. A method for measuring a plurality of gap openings between a plurality of door edges and a plurality of respective door frame components comprising the steps of:
    (a) providing a device having a plurality of planar reference bases and a plurality of planar measuring surfaces,
    (b) selecting one of said reference bases and corresponding said measuring surface pertaining to one of said gap openings,
    (c) inserting said device into said gap opening,
    (d) positioning said reference base adjacent said at least one of said door frame components corresponding to said gap opening, (e) monitoring position of said measuring surface with respect to at least one of said respective door edges corresponding to said gap opening, (f) determining a gap opening measurement for said gap opening, and (g) repeating steps (a) through (f) for all said gap openings.

17. A method as recited in claim 16 further including the step of comparing said gap opening measurement to a plurality of building codes, which set forth the standards for such gap opening measurements, to determine door gap opening compliance.

18. A method as recited in claim 17 further including the step of moving said device along the entire length of said door gap opening and comparing said gap spacing measurement along the entire length of said door gap opening to said building codes to determine door gap opening compliance.

19. A device for measuring spatial dimensions of door gap openings, and for determining compliance with a plurality of building codes, which set forth the standards for such spatial dimensions, comprising:

a block of material;

said block of material having a first planar reference base;

a first plurality of planar measuring surfaces parallel to said first reference base at different distances from said first base to establish a different measurement width for different ones of said measuring surfaces, said block of material having a second planar reference base normal to said first planar reference base;

a second plurality of planar measuring surfaces parallel to said second reference base at different distances from said second base to establish a different measurement width for different ones of said measuring surfaces; and connecting surfaces for joining said measuring surfaces of said first and second reference bases both to their respective parallel reference bases and to other said parallel measuring surfaces, some of said connecting surfaces also serve as measuring surfaces when said device is used with the other said reference base.

20. The device of claim 19 wherein the distances between said first reference base and five of said measuring surfaces produce a plurality of measurement widths $\frac{1}{16}$", $\frac{1}{8}$", $\frac{3}{16}$", $\frac{1}{4}$", and $\frac{3}{8}$", and the distance between said second reference base and at least one of said second plurality of reference surfaces produce a measurement width $\frac{3}{4}$", said measurement widths pertaining to said codes.

* * * * *